(12) United States Patent
Louwet et al.

(10) Patent No.: US 7,048,874 B2
(45) Date of Patent: May 23, 2006

(54) PROCESS FOR PREPARING AN AQUEOUS OR NON-AQUEOUS SOLUTION OR DISPERSION OF A POLYTHIONPHENE OR THIOPHENE COPOLYMER

(75) Inventors: Frank Louwet, Diepenbeek (BE); Bert Groenendaal, Sinaai (BE)

(73) Assignee: AGFA-Gevaert, Mortsel (BE)

( * ) Notice: Subject to any disclaimer, the term of this patent is extended or adjusted under 35 U.S.C. 154(b) by 482 days.

(21) Appl. No.: 10/308,567

(22) Filed: Dec. 3, 2002

(65) Prior Publication Data
US 2003/0211331 A1 Nov. 13, 2003

Related U.S. Application Data
(60) Provisional application No. 60/349,573, filed on Jan. 18, 2002, provisional application No. 60/350,453, filed on Jan. 22, 2002, and provisional application No. 60/382,577, filed on May 22, 2002.

(30) Foreign Application Priority Data
Dec. 4, 2001 (EP) ............ 01000698
Dec. 20, 2001 (EP) ............ 01000780
May 16, 2002 (EP) ............ 02100500

(51) Int. Cl.
H01B 1/00 (2006.01)
C08G 61/12 (2006.01)
C09D 165/00 (2006.01)

(52) U.S. Cl. ............ 252/500; 526/91; 528/378
(58) Field of Classification Search ............ 252/500; 524/911; 526/91; 528/377, 378
See application file for complete search history.

(56) References Cited
U.S. PATENT DOCUMENTS
| | | | |
|---|---|---|---|
| 5,221,786 A * | 6/1993 | Destryker et al. | 526/93 |
| 5,443,944 A | 8/1995 | Krafft et al. | |
| 5,766,515 A * | 6/1998 | Jonas et al. | 252/500 |
| 6,084,040 A | 7/2000 | Jonas et al. | |
| 6,852,830 B1 * | 2/2005 | Groenendaal et al. | 528/373 |

FOREIGN PATENT DOCUMENTS
| | | |
|---|---|---|
| DE | 42 11 459 A1 | 10/1993 |
| EP | 0440957 A | 8/1991 |
| EP | 0 686 662 A2 | 12/1995 |
| EP | 1 010 733 A2 | 6/2000 |
| EP | 1 081 548 A1 | 3/2001 |
| JP | 59 210947 | 11/1984 |
| WO | WO 00/16595 A | 3/2000 |
| WO | WO 02/00759 A1 | 1/2002 |
| WO | WO 03/048227 A1 * | 6/2003 |

OTHER PUBLICATIONS
European Search Report (May/2002).
European Search Report 01 00 0698 (May 8, 2002).

* cited by examiner

*Primary Examiner*—Mark Kopec
(74) *Attorney, Agent, or Firm*—Leydig, Voit & Mayer Ltd.

(57) ABSTRACT

A process for preparing an aqueous or non-aqueous solution or dispersion of a polythiophene or thiophene copolymer, containing structural units according to formula (I):

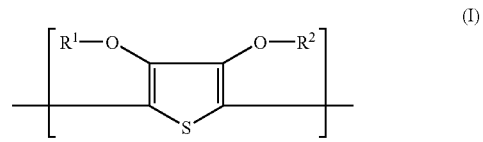

in which $R^1$ and $R^2$ independently of one another represent hydrogen or a $C_{1-5}$-alkyl group or together form an optionally substituted $C_{1-5}$-alkylene residue, comprising the step of: preparing the polythiophene or thiophene copolymer with an initiator in a reaction medium in the presence of polyanions under oxidizing or reducing conditions under an inert atmosphere such that when said initiator is added less than 3 mg of oxygen per litre of the reaction medium is present in the reaction medium; an aqueous or non-aqueous solution or dispersion prepared therewith; the use of an aqueous or non-aqueous dispersion or solution comprising the aqueous or non-aqueous solution or dispersion of a polythiophene or thiophene copolymer for coating an object; a printable paste containing the aqueous or non-aqueous solution or dispersion of a polythiophene or thiophene copolymer; and an electroconductive or an antistatic layer prepared using an aqueous or non-aqueous solution or dispersion comprising the aqueous or non-aqueous solution or dispersion of a polythiophene or thiophene copolymer.

8 Claims, No Drawings

PROCESS FOR PREPARING AN AQUEOUS OR NON-AQUEOUS SOLUTION OR DISPERSION OF A POLYTHIONPHENE OR THIOPHENE COPOLYMER

The application claims the benefit of U.S. Provisional Application No. 60/349,573 filed Jan. 18, 2002, U.S. Provisional Application No. 60/350,453 filed Jan. 22, 2002 and U.S. Provisional Application No. 60/382,577 filed May 22, 2002, all of which are incorporated by reference.

FIELD OF THE INVENTION

The present invention relates to a process for producing poly(3,4-dialkoxythiophene) polymers in the presence of a polyanion.

BACKGROUND OF THE INVENTION

Polythiophenes have been studied extensively due to their interesting electrical and/or optical properties. Polythiophenes become electrically conducting upon chemical or electrochemical oxidation or reduction.

EP-A 257 573 discloses an intrinsically electrically conductive polymer, wherein through connection in the 2-position and/or the 5-position are coupled to one another, statistically averaged from 60 to 100% by weight structural units, which are derived from at least one monomer of the formula (1):

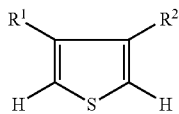

(1)

in which $R^1$ is a $C_{1-2}$-alkoxy group or —O(CH$_2$CH$_2$O)$_n$CH$_3$ with n=1 to 4 and $R^2$ is a hydrogen atom, a $C_{1-12}$-alkyl group, a $C_{1-12}$-alkoxy group or —O(CH$_2$CH$_2$O)$_n$CH$_3$ with n=1 to 4, or $R^1$ and $R^2$ together are —O(CH$_2$)$_m$—CH$_2$— or —O(CH$_2$)$_m$—O— with m=1 to 12, 0 to 40% by weight structural units, which are derived from at least one monomer of the formula (2):

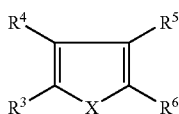

(2)

wherein $R^4$ and $R^5$ are independently of one another a hydrogen atom, a halogen atom, a $C_{1-12}$-alkyl group or aryl or together with C-atoms connected to them form an aromatic ring, $R^3$ and $R^6$ independently of one another represent a hydrogen atom or $R^3$ together with $R^4$ and the C-atoms connected to them or $R^5$ together with $R^6$ and the C-atoms connected to them each form an aromatic ring, X represents an oxygen atom, a sulphur atom, a =NH group, a =N-alkyl group or a =N-aryl group, 0 to 40% by weight structural units, which are derived from at least one monomer of formula (3):

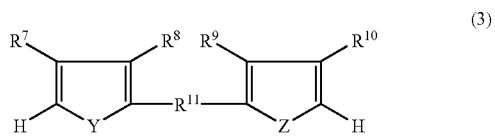

(3)

where $R^7$, $R^8$, $R^9$ and $R^{10}$ independently of one another represent a hydrogen atom, a $C_{1-12}$-alkyl group, a $C_{1-12}$-alkoxy group or an aryl group, Y and Z independently of one another represent an oxygen is atom, a sulfur atom, a =NH group, a =N-alkyl group or a =N-aryl group, $R^{11}$ represents an arylene group, a heteroarylene group or a conjugated system of the formula (CH=CH)$_o$, wherein o is 1, 2 or 3, 0 to 40& by weight structural units, which are derived from at least one monomer of formula (4):

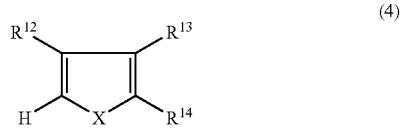

(4)

wherein $R^{12}$ and $R^{13}$ independently of one another represent a hydrogen atom, a halogen atom, a $C_{1-12}$-alkyl group, a $C_{1-12}$-alkoxy group, a $C_{1-4}$-alkylamino group or a $C_{1-4}$-acylamino group, $R^{14}$ represents a halogen atom, a $C_{1-12}$-alkyl group, a $C_{1-12}$-alkoxy group, a $C_{1-4}$-alkylamino group or a $C_{1-4}$-acylamino group and X has the meaning given above, wherein the polymer in the oxidized form is completely soluble in dipolar aprotic solvents at 25° C. and solutions with a content of at least 0.1 g of the polymer in 100 mL solvent at 25° C. are obtained.

EP-A 339 340 discloses a polythiophene containing structural units of the formula:

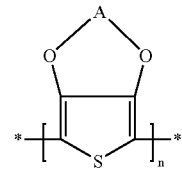

in which A denotes an optionally substituted $C_{1-4}$-alkylene radical and its preparation by oxidative polymerization of the corresponding thiophene.

EP-A 440 957 discloses dispersions of polythiophenes, constructed from structural units of formula (I):

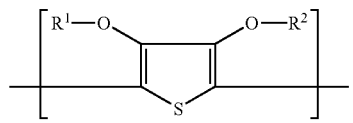

in which $R^1$ and $R^2$ independently of one another represent hydrogen or a $C_{1-4}$-alkyl group or together form an optionally substituted $C_{1-4}$-alkylene residue, in the presence of polyanions. In Example 3 air is bubbled through the polymerizing solution.

Furthermore, Walsh et al. in 1999 in Macromolecules, volume 32, pages 2397–2399 reported the preparation of 3-substituted heteroaryl polythiophene by chemical polymerization using 4 molar equivalents of FeCl$_3$ in chloroform at 50° C. under a slow purge of dry air; and Pomerantz et al. in 1991 in Synthetic Metals, volumes 41–43, pages 825–830 reported the preparation of poly(3-alkylthiophenes) using anhydrous $FeCl_3$ in chloroform while dry air was bubbled through the reaction mixture.

However, electropolymerization of polymers, such as polymers of 5-membered heterocyclic compounds containing 1 atom of an element from the O or N group, is classically carried out under a blanket of inert gas, see, for example, JP 59–210947 and Zhang et al. in 2001 in Journal of Solid State Electrochemistry, volume 5, pages 74–79.

A general drawback of conductive polymers which have been prepared and studied up to now, is that their conductivities are still too low for certain applications, their visible light transmittances are insufficiently high, their stability to visible and UV light exposure is too low and/or they are not processable.

OBJECTS OF THE INVENTON

It is therefore an aspect of the present invention to provide polythiophenes and thiophene copolymers which exhibit high electrical conductivities, high visible light transmittances, high stability to visible and UV light exposure and good processability.

Further aspects and advantages of the invention will become apparent from the description hereinafter.

SUMMARY OF THE INVENTION

Classically polythiophenes have been polymerized in the presence of air, even with air bubbled through the reaction mixture. It has been surprisingly found that polythiophenes or copolymers of thiophenes oxidatively or reductively polymerized under an inert gas atmosphere in the presence of a polyanion, such as poly(styrenesulphonic acid) in an aqueous medium such that less than 3 mg of oxygen is present per litre of reaction medium, exhibit substantially increased conductivity at a particular transparency and improved stability over polythiophenes polymerized in the presence of air.

Aspects of the present invention are realized with a process for preparing an aqueous or non-aqueous solution or dispersion of a polythiophene or thiophene copolymer, containing structural units according to formula (I):

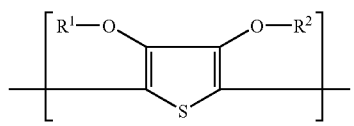

(I)

in which $R^1$ and $R^2$ independently of one another represent hydrogen or a $C_{1-5}$-alkyl group or together form an optionally substituted $C_{1-5}$-alkylene residue, comprising the step of: preparing the polythiophene or thiophene copolymer with an initiator in a reaction medium in the presence of polyanions under oxidizing or reducing conditions under an inert atmosphere such that when said initiator is added less than 3 mg of oxygen per litre of the reaction medium is present in the reaction medium.

Aspects of the present invention are also realized with an aqueous or non-aqueous solution or dispersion of a polythiophene or thiophene copolymer obtainable by the above-disclosed process.

Aspects of the present invention are also realized by providing the use of an aqueous or non-aqueous solution or dispersion comprising the above-disclosed aqueous solution or dispersion of a polythiophene or thiophene copolymer.

Aspects of the present invention are also realized with a printable paste containing the above-disclosed aqueous or non-aqueous solution or dispersion of a polythiophene or thiophene copolymer.

Aspects of the present invention are also realized with an electroconductive layer prepared using an aqueous or non-aqueous solution or dispersion comprising the above-disclosed aqueous or non-aqueous solution or dispersion of a polythiophene or thiophene copolymer.

Aspects of the present invention are also realized with an antistatic layer prepared using an aqueous or non-aqueous solution or dispersion comprising an aqueous or non-aqueous dispersion of a polythiophene or thiophene copolymer.

Further aspects of the present invention are disclosed in the dependent claims.

DETAILED DESCRIPTION OF THE INVENTION

Definitions

The term $C_{1-5}$-alkylene group represents methylene, 1,2-ethylene, 1,3-propylene, 1,4-butylene and 1,5-pentylene groups.

The term initiator means a species capable of initiating polymerization.

The term alkyl means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term aqueous for the purposes of the present invention means containing at least 60% by volume of water, preferably at least 80% by volume of water, and optionally containing water-miscible organic solvents such as alcohols e.g. methanol, ethanol, 2-propanol, butanol, iso-amyl alcohol, octanol, cetyl alcohol etc.; glycols e.g. ethylene glycol; glycerine; N-methyl pyrrolidinone; methoxypropanol; and ketones e.g. 2-propanone and 2-butanone etc.

The term "polyhydroxy non-aqueous solvent" means a non-aqueous solvent having at least two hydroxy groups.

The term azeotrope, otherwise known as azeotropic mixture, as used in the disclosing the present invention means a solution of two or more liquids, the composition of which does not change upon distillation.

The term conductive layer as used in disclosing the present invention includes both electroconductive coatings and antistatic layers.

The term electroconductive means having a surface resistance below $10^6$ 106 /square.

The term antistatic means having a surface resistance in the range from $10^6$ to $10^{11}$ Ω/square meaning it cannot be used as an electrode.

The term "conductivity enhancement" refers to a process in which the conductivity is enhanced e.g. by contact with high boiling point liquids such as di- or polyhydroxy- and/or carboxy groups or amide or lactam group containing organic compound optionally followed by heating at elevated temperature, preferably between 100 and 250° C., during preferably 1 to 90 seconds, results in conductivity increase. Alternatively in the case of aprotic compounds with a dielectric constant $\geq 15$, e.g. N-methyl-pyrrolidinone, temperatures below 100° C. can be used. Such conductivity enhancement is observed with polythiophenes and can take place during the preparation of the outermost layer or subsequently. Particularly preferred liquids for such treatment are N-methyl-pyrrolidinone and diethylene glycol such as disclosed in EP-A 686 662 and EP-A 1 003 179.

PEDOT as used in the present disclosure represents poly(3,4-ethylenedioxythiophene).

EDOT as used in the present disclosure represents 3,4-ethylenedioxythiophene.

ADOT as used in the present disclosure represents 3,4-alkylenedioxythiophene).

PSS as used in the present disclosure represents poly(styrenesulphonic acid) or poly(styrenesulphonate).

PET as used in the present disclosure represents poly(ethylene terephthalate).

Process for Preparing an Aqueous or Non-aqueous Solution or Dispersion of a Polythiophene or Thiophene Copolymer Aspects of the present invention are realized with a process for preparing an aqueous or non-aqueous solution or dispersion of a polythiophene or thiophene copolymer, containing structural units according to formula (I):

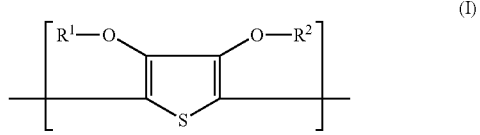

(I)

in which $R^1$ and $R^2$ independently of one another represent hydrogen or a $C_{1-5}$-alkyl group or together form an optionally substituted $C_{1-5}$-alkylene residue, comprising the step of: preparing the polythiophene or thiophene copolymer with an initiator in a reaction medium at 25° C. and atmospheric pressure in the presence of polyanions under oxidizing or reducing conditions under an inert atmosphere such that when said initiator is added less than 3 mg of oxygen per litre of the reaction medium is present in the reaction medium.

According to a first embodiment of the process, according to the present invention, comprising the step of: preparing the polythiophene or thiophene copolymer with an initiator in a reaction medium at 25° C. and atmospheric pressure in the presence of polyanions under oxidizing or reducing conditions under an inert atmosphere such that when said initiator is added less than 1.5 mg of oxygen per litre of the reaction medium is present in the reaction medium.

According to a second embodiment of the process, according to the present invention, comprising the step of: preparing the polythiophene or thiophene copolymer with an initiator in a reaction medium at 25° C. and atmospheric pressure in the presence of polyanions under oxidizing or reducing conditions under an inert atmosphere such that when said initiator is added less than 0.5 mg of oxygen per litre of the reaction medium is present in the reaction medium.

The concentration of oxygen in the reaction medium can be regulated by any means e.g. freeze-thaw techniques, prolonged bubbling of an inert gas such as argon, nitrogen or helium through the reaction medium, consumption of oxygen in a sacrificial reaction under an inert gas blanket. The inert gas is preferably bubbled through the reaction medium until the polymerization is completed, thereby maintaining an oxygen concentration in the reaction medium of less than 3 mg of oxygen per litre of the reaction medium.

According to a third embodiment of the process, according to the present invention, the inert atmosphere is a nitrogen, helium or argon atmosphere.

According to a fourth embodiment of the method, according to the present invention the ratio by weight of polymer or copolymer of (3,4-dialkoxythiophene) to polyanion in the solution or dispersion is in the range of 1:0.95 to 1:6.5.

According to a fifth embodiment of the method, according to the present invention the ratio by weight of polymer or copolymer of (3,4-dialkoxythiophene) to polyanion in the solution or dispersion is in the range of 1:1.8 to 1:6.4.

According to a sixth embodiment of the method, according to 20 the present invention the ratio by weight of polymer or copolymer of (3,4-dialkoxythiophene) to polyanion in the solution or dispersion is in the range of 1:3.0 to 1:6.4.

According to a seventh embodiment of the process, according to the present invention, the structural units according to formula (I) are selected from the group consisting of optionally alkyl group-substituted 3,4-methylenedioxy-thiophene units, optionally alkyl or aryl-group-substituted 3,4-ethylenedioxythiophene units, optionally alkyl or aryl-group-substituted 3,4-ethylenedioxythiophene units, a unit according to formula (I) in which $R^1$ and $R^2$ are together a 1,2-cyclohexene group, optionally alkyl or aryl-group-substituted 3,4-propylenedioxythiophene units, optionally alkyl or aryl-group-substituted 3,4-butylenedioxythiophene units and optionally alkyl or aryl-group-substituted 3,4-pentylenedioxythiophene units.

According to an eighth embodiment of the process, according to the present invention, the thiophene copolymer is a copolymer of at least one 3,4-alkylenedioxythiophene compound with a solubility in water at 25° C. of less than 2.2 g/L with at least one 3,4-alkylenedioxythiophene compound with a solubility in water at 25° C. of at least 2.2 g/L and a polyanion.

According to a ninth embodiment of the process, according to the present invention, the 3,4-alkylenedioxythiophene compound with a solubility in water at 25° C. of at least 2.2 g/L is selected from the group consisting of: 3,4-dihydro-2H-thieno[3,4-b][1,4]dioxin-2-yl)methanol, 3,4-dihydro-2H-thieno[3,4-b][1,4]dioxepin-3-ol, (2,3-dihydro-thieno[3,4-b][1,4]dioxin-2-yl-methoxy)-acetic acid ethyl ester, (2,3-dihydro-thieno[3,4-b][1,4]dioxin-2-yl-methoxy)-acetic acid, 2-{2-[2-(2-methoxy-ethoxy)-ethoxy]-ethoxymethyl}-2,3-dihydro-thieno[3,4-b][1,4]dioxine and 4-(2,3-dihydro-thieno[3,4-b][1,4]dioxin-2-ylmethoxy)-butane-1-sulfonic acid sodium salt.

The oxidation agents used for the oxidative polymerisation of pyrrole, such as described for example in Journal of the American Chemical Society, volume 85, pages 454–458 (1963) and J. Polymer Science Part A Polymer Chemistry, volume 26, pages 1287–1294 (1988), can be utilized for the oxidative polymerization of thiophenes.

According to a tenth embodiment of the process, according to the present invention, the polymerization is oxidative and the inexpensive and easily accessible oxidation agents used for initiating the polymerization are selected from the group consisting of iron(III) salts such as $FeCl_3$, the iron(III) salts of organic acids, e.g. $Fe(OTs)_3$, $H_2O_2$, $K_2Cr_2O_7$, alkali and ammonium persulphates, alkali perborates and potassium permanganate.

Theoretically the oxidative polymerization of thiophenes requires 2.25 equivalents of oxidation agent per mole thiophene of formula (I) [see e.g. J. Polymer Science Part A Polymer Chemistry, volume 26, pages 1287–1294 (1988)]. In practice an excess of 0.1 to 2 equivalents of oxidation agent is used per polymerizable unit. The use of persulphates and iron(III) salts has the great technical advantage that they do not act corrosively. Furthermore, in the presence of particular additives oxidative polymerization of the thiophene compounds according to formula (I) proceeds so slowly that the thiophenes and oxidation agent can be brought together as a solution or paste and applied to the substrate to be treated. After application of such solutions or pastes the oxidative polymerization can be accelerated by heating the coated substrate as disclosed in U.S. Pat. No. 6,001,281 and WO 00/14139 herein incorporated by reference.

Reductive polymerization can be carried out using Stille (organotin) routes or Suzuki (organoboron) routes as disclosed in 2001 in Tetrahedron Letters, volume 42, pages 155–157 and in 1998 in Macromolecules, volume 31, pages 2047–2056 respectively or with nickel complexes as disclosed in 1999 in Bull. Chem. Soc. Japan, volume 72, page 621 and in 1998 in Advanced Materials, volume 10, pages 93–116.

According to an eleventh embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight. It is preferred that at least one of the non-aqueous solvents added is incapable of forming an azeotrope with water. It is preferred that a further of the at least one of the non-aqueous solvents added is capable of forming an azeotrope with water. This enables the water to be evaporated off more rapidly and is advantageously added once the water content has been substantially reduced to expedite the reduction of the residual water content. Ethanol, isopropanol, n-propanol, n-butanol, sec-butanol, methylisobutylketone, ethyl acetate and are all examples of organic liquids, which form binary azeotropes with water. n-Butanol, for example, enables water contents below 5% by weight to be easily achieved.

In general the degree to which water can be removed in the process, according to the present invention, will depend upon the ability of the water to diffuse through the dispersion to the surface, which is dependent upon the viscosity of the polythiophene or thiophene copolymer/polyanion under the evaporation conditions. However, the viscosity of the polythiophene or thiophene copolymer/polyanion dispersions is strongly dependent upon the polythiophene or thiophene copolymer/polyanion-content in the final dispersion. Water-contents of 1 to 5% by weight can be easily realized with dispersions of 0.8% by weight PEDOT/PSS with a weight ratio of PEDOT to PSS of 1:2.4, but just increasing the content of PEDOT/PSS, with a weight ratio of PEDOT to PSS of 1:2.4, to 1.0% by weight has such a strong influence on the viscosity of the dispersion that the easily realizable water-content increases to 10 to 15% by weight.

It is preferred that the temperature at which the distillation is carried out is a temperature at or below 80° C., particularly preferably at or below 70° C. Distillation at a temperature of 88–89° C. has been found to yield a polythiophene or thiophene copolymer/polyanion-dispersion, which upon working up to a screen printing paste gives prints with a significantly higher surface resistance.

It should be pointed out that the viscoelastic properties of the polythiophene or thiophene copolymer/polyanion-dispersions obtained with the method, according to the present invention, are stable upon storage under ambient conditions.

According to a twelfth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 70% by weight.

According to a thirteenth embodiment of the process, according to the present invention, the process further comprises the steps of: (i) mixing at least one non-aqueous solvent with the aqueous dispersion of the polymer or copolymer of (3,4-dialkoxythiophene) and the polyanion; and (ii) evaporating water from the mixture prepared in step (i) until the content of water therein is reduced by at least 80% by weight.

According to a fourteenth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 90% by weight.

According to a fifteenth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 95% by weight.

According to a sixteenth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 99% by weight.

According to a seventeenth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein the non-aqueous solvent forms an azeotropic mixture with water. This enables the water to be evaporated off more rapidly. n-Butanol is an example of such a non-aqueous solvent and enables water contents below 5% by weight to be easily achieved.

Oxygen Measurements

The oxygen concentration can be measured with a Knick Process Unit 73 $O_2$, using InPro 6000 Series $O_2$ sensors, available from Mettler Toledo. These sensors are based on a polarographic oxygen measurement. The Clark polarographic sensor consists basically of a working electrode (cathode), a counter/reference electrode (anode), and an oxygen-permeable membrane that separates the electrodes from the medium. The transmitter supplies a constant polarization voltage to the cathode, needed to reduce oxygen. The oxygen molecules that migrate through the membrane are reduced at the cathode. At the same time oxidation takes place at the anode and oxidized anode metal (silver) is liberated into the electrolyte. The electrolyte closes the electric circuit between the anode and the cathode (ion conductivity). The current, produced in this way, is measured by the transmitter and is proportional to the partial pressure of oxygen ($O_2$) in the sample medium.

The amount of oxygen in an aqueous 6 wt % aqueous solution of poly(styrenesulphonic acid) determined via this technique is 6.5 mg/L.

A poly(styrenesulphonic acid) solution at 25° C. and 1013 hPa (mbar) saturated with oxygen by bubbling oxygen through it has an oxygen content of 38.45 mg/L. This value may be regarded as the max solubility of oxygen in a poly(styrenesulphonic acid) solution at 25° C. and 1013 hPa (mbar).

Structural Units According to Formula (I)

Thiophene monomers corresponding to structural units according to formula (I):

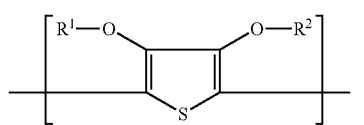

in which $R^1$ and $R^2$ independently of one another represent hydrogen or a $C_{1-5}$-alkyl group or together form an optionally substituted $C_{1-5}$-alkylene residue, can be prepared by known methods such the transetherification reaction disclosed in DE 3804522 and in HOUBEN-WEYL, volume VI/3, part 3, pages 171–173 (1971) using a thiophene derivative such as 3,4-dimethoxythiophene, or the double Williamson reaction as disclosed in 1994 in Electrochimica Acta in volume 39, pages 1345–1347 using a thiophene derivative such as the dimethyl ester of 3,4-dihydroxythiophene-2,5-dicarboxylic acid.

Polyanion Compound

The polyanion compounds for use in the dispersion according to the present invention are disclosed in EP-A 440 957 and include polymeric carboxylic acids, e.g. polyacrylic acids, polymethacrylic acids, or polymaleic acids and polysulphonic acids, e.g. poly(styrenesulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to an eighteenth embodiment of the process, according to the present invention, the polyanion is poly(styrenesulphonic acid).

Non-aqueous Solvents

According to a nineteenth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein non-aqueous solvent is selected from the group consisting of alcohols, ketones, arenes, esters, ethers, and their mixtures.

According to a twentieth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein the non-aqueous solvent is a glycol ether or a cyclic ether, such as tetrahydrofuran.

According to a twenty-first embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein the non-aqueous solvent is water-miscible.

According to a twenty-second embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein the at least one non-aqueous solvent is a polyhydroxy non-aqueous solvent.

According to a twenty-third embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein at least one further non-aqueous solvent is added in a further process step.

According to a twenty-fourth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein the non-aqueous solvent is a di- or polyhydroxy- and/or carboxy groups or amide or lactam group containing organic compound for example sugar alcohols, such as sorbitol, mannitol, saccharose and fructose, diethylene glycol, 1,2-propandiol, propylene glycol N-methyl pyrrolidinone and conductive coatings therefrom which are tempered to decrease their resistance preferably to <300 Ω/square as disclosed in EP-A 686 662, hereby incorporated by reference.

The suitability of particular non-aqueous solvents can be evaluated by mixing 8 g of a 1.2% by weight aqueous dispersion of PEDOT/PSS with 12 g of solvent. If miscibility is observed without gel formation, the non-aqueous solvent is regarded as suitable. Tetrahydrofuran is miscible, but the dispersions are very viscous. Suitability according to the above miscibility test does not rule out phase separation upon further dilution of the PEDOT/PSS-dispersion with the same solvent, as is observed with tetrahydrofuran. It will be understood by one skilled in the art that a PEDOT/PSS-dispersion cannot be diluted to an unlimited extent without the possibility of phase separation.

Ethyl lactate induces gel-formation and hence is unsuitable. Benzyl alcohol, furfuryl alcohol and cyclohexane produced phase separation and hence are unsuitable.

According to a twenty-fifth embodiment of the process, according to the present invention, the process further comprises the steps of: (i) mixing at least one non-aqueous solvent with the aqueous dispersion of the polythiophene or thiophene copolymer containing structural units according to formula (I); and (ii) evaporating water from the mixture prepared in step (i) until the content of water therein is reduced by at least 65% by weight; and wherein the non-aqueous solvent is selected from the group consisting of 1,2-propandiol, propylene glycol, diethylene glycol, N-methyl pyrrolidinone, N,N-dimethylformamide, N-methylacetamide, N,N-dimethylacetamide, glycerol, hexylene glycol and carbitol acetate.

Binders

Aspects of the present invention are also realized with an aqueous or non-aqueous solution or dispersion of a polythiophene or thiophene copolymer obtainable by the process according to the present invention.

According to a first embodiment of the aqueous or non-aqueous solution or dispersion of a polythiophene or thiophene copolymer, according to the present invention, the aqueous or non-aqueous solution or dispersion of a polythiophene or thiophene copolymer further contains a binder. This binder binds together the ingredients of the antistatic or electroconductive layer produced with the composition according to the present invention such that a non-planar structure on a support can be better coated. This binder may also increase the viscosity of the composition produced according to the method of the present invention.

According to a second embodiment of the aqueous or non-aqueous solution or dispersion of a polythiophene or thiophene copolymer, according to the present invention, the aqueous or non-aqueous solution or dispersion of a polythiophene or thiophene copolymer further contains a polyester urethane copolymer binder e.g. DISPERCOLL VPKA 8481 from BAYER.

According to a third embodiment of the aqueous or non-aqueous solution or dispersion of a polythiophene or thiophene copolymer, according to the present invention, the aqueous or non-aqueous solution or dispersion of a polythiophene or thiophene copolymer further contains a binder, the binder being selected from the group consisting polyacrylates, carboxymethylcellulose, polyvinylpyrrolidone, hydroxypropylcellulose, carboxylate-containing copolymers with sulfonic acid groups, hydroxy-modified acrylic acid copolymers and poly(vinyl alcohol).

The suitability of binders was assessed by adding 0.1% by weight of the particular binder to a typical dispersion medium for the PEDOT/PSS-containing compositions of the present invention such as 87% by weight of 1,2-propandiol, 9% by weight of diethylene glycol, 3% by weight of deionized water, 0.5% by weight of ZONYL® FSO and 0.5% by weight of silicone antifoam agent X50860A. A binder which dissolved in such a dispersion medium to the extent of 0.1% by weight was regarded as suitable for the compositions according to the present invention.

Particularly suitable binders include:

binder 01= CARBOPOL® ETD-2623, a homo- and copolymers of acrylic acid crosslinked with a polyalkenyl polyether, from B. F. Goodrich;

-continued binder 02= CARBOPOL® Aqua 30, a latex of a copolymer of acrylic acid and ethyl acrylate from B. F. Goodrich;
binder 03= AMBERGUM® 3021, a carboxymethylcellulose from Hercules Inc.;
binder 04= LUVISKOL® K30, a polyvinyl pyrrolidone from BASF;
binder 05= a hydroxyalkyl cellulose methylpropylether from Shin-Etsu Chemical Company;
binder 06= KLUCEL® L, hydroxypropylcellulose from Hercules Inc.;
binder 07= NEOCRYL® BT24, an acrylate-based aqueous latex from Zenica;
binder 08= AQUACER® 503, an acrylate-based aqueous latex from BYC Cera;
binder 09= POLYPHOBE® TR117, an acrylate-based aqueous latex from Union Carbide;
binder 10= AMOREX® CR2900, an acrylate-based aqueous latex from Westvaco Corporation;
binder 11= CRX-8057-45, an acrylate-based aqueous latex from Westvaco Corporation;
binder 12= PRIMAL™ EP-5380, a 54% by weight acrylate-based aqueous latex from Rohm and Haas;
binder 13= JAGOTEX® KEM1020, a 58% by weight acrylate-based aqueous latex from Ernst Jager Chem. Rohstoffe GmbH;
binder 14= PERMUTEX® PS-34 = 320, a 54% by weight acrylate-based aqueous latex from Stahl Holland BV;
binder 15= JAGOTEX® KEM4009, a 55% by weight acrylate copolymer aqueous latex from Ernst Jager Chem. Rohstoffe GmbH;
binder 16= GOOD RITE® K797, a 50% by weight acrylic acid-AMPS copolymer aqueous latex from B. F. Goodrich;
binder 17= GOOD RITE® K-7058, a 50% by weight water-soluble acrylic acid polymer from B. F. Goodrich;
binder 18= NARLEX® DX2020, an acrylic acid/styrene copolymer latex from Alco Chemical;
binder 19= ALCOPERSE® 725, an acrylic acid/styrene copolymer latex from Alco Chemical;
binder 20= CARBOPOL® EP2, a 18.1% by weight non-crosslinked methacrylate acid/ethyl acrylate copolymer latex from B. F. Goodrich
binder 21= 97.5–99.5% hydrolyzed poly(vinyl alcohol) from WACKER CHEMIE.
binder 22= DISPERCOLL™ U VP KA 8481, a polyester urethane copolymer dispersion from BAYER Binders 1, 2 and 20 have a very strong influence upon the viscosity of the dispersion independent of the PEDOT/PSS-content.

Pigments and Dyes

According to a fourth embodiment of the aqueous or non-aqueous solution or dispersion of a polythiophene or thiophene copolymer, according to the present invention, the aqueous or non-aqueous solution or dispersion of a polythiophene or thiophene copolymer further contains a pigment or dye to provide coloured or non-transparent compositions. Transparent coloured compositions can be realized by incorporating coloured dyes or pigments e.g. diazo and phthalocyanine pigments.

Non-transparent compositions can also be realized by incorporating a black pigment such as LEVANYL® A-SF from BAYER, LEVANYL® NLF from BAYER, KL1925, a carbon black dispersion from Degussa, and MHI Black 8102M, a carbon black dispersion from Mikuni, or titanium dioxide pigments in a weight sufficient to give non-transparency in the layer thickness being coated.

Suitable pigments include:

| Pigment nr | Pigment | Manufacturer | Structure |
|---|---|---|---|
| PIG01 | FLEXONYL® Blue B2G | CLARIANT | (copper phthalocyanine structure) |
| PIG02 | LEVANYL® Yellow HR-LF | BAYER | (disazo yellow pigment structure) |
| PIG03 | NOVOPERM® Yellow HR02 | CLARIANT | (disazo yellow pigment structure) |
| PIG04 | LEVANYL® Blue G-LF | BAYER | (copper phthalocyanine structure) |

| Pigment nr | Pigment | Maufacturer | |
|---|---|---|---|
| PIG05 | HOSTAPERM ® Blue B2G | CLARIANT | 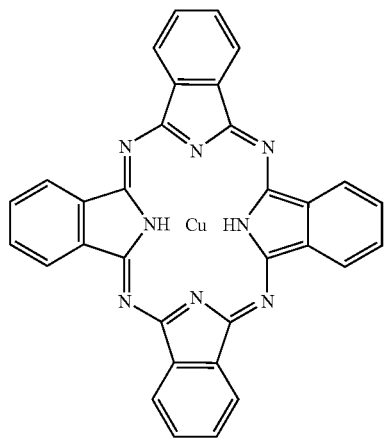 |
| PIG06 | HOSTAPERM ® Blue B2G-L | CLARIANT | 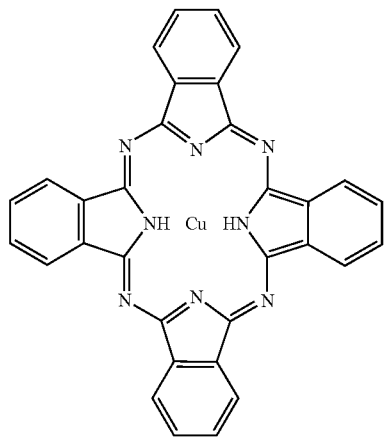 |
| PIG07 | LEVANYL ® N-LF | BAYER | a carbon black pigment dispersed in water |
| PIG08 | LEVANYL ® A-SF | BAYER | a carbon black pigment dispersed in water |
| PIG09 | MHI 8102M | DEGUSSA | a carbon black pigment dispersed in water |
| PIG10 | GA Black 1 | Mikuni Color Ltd | a carbon black pigment dispersed in water |
| PIG11 | Bonjet Black CW-2 | Orient Chemicals Industries Ltd | a carbon black pigment dispersed in water |
| PIG12 | Bonjet Black CW-1 | Orient Chemicals Industries Ltd | a carbon black pigment dispersed in water |
| PIG13 | FX-GBI-015 | Nagase Nippon Shokubai | a carbon black pigment dispersed in 2-butanone (50–80%) + methylisobutylketone (8–20%) |
| PIG14 | LEVANYL ® B-LF | BAYER | a carbon black pigment dispersed in water |
| PIG15 | TPX100 | CABOT CORP | a 20% dispersion of a modified carbon black in water |
| PIG16 | TPX100 | CABOT CORP | a 15% dispersion of a modified carbon black in water |

Crosslinking Agents

According to a fifth embodiment of the aqueous or non-aqueous solution or dispersion of a polythiophene or thiophene copolymer, according to the present invention, the aqueous or non-aqueous solution or dispersion of a polythiophene or thiophene copolymer further contains a cross-linking agent is added in a further process step. Suitable cross-linking agents are epoxysilane (e.g 3-glycidoxypropyltrimethoxysilane), hydrolysis products of silanes (e.g. hydrolysis products of tetraethyoxysilane or tetramethoxy-silane) as disclosed in EP 564 911, herein incorporated by reference, and di- or oligo-isocyanates optionally in blocked form.

Anti-foaming Agents

According to a sixth embodiment of the aqueous or non-aqueous solution or dispersion of a polythiophene or thiophene copolymer, according to the present invention, the aqueous or non-aqueous solution or dispersion of a polythiophene or thiophene copolymer further contains an anti-foaming agent.

A suitable anti-foaming agent is the silicone antifoam agent X50860A.

Surfactants

According to a seventh embodiment of the aqueous or non-aqueous solution or dispersion of a polythiophene or thiophene copolymer, according to the present invention, the aqueous or non-aqueous solution or dispersion of a polythiophene or thiophene copolymer further contains a surfactant.

According to an eighth embodiment of the aqueous or non-aqueous solution or dispersion of a polythiophene or thiophene copolymer, according to the present invention, the aqueous or non-aqueous solution or dispersion of a polythiophene or thiophene copolymer further contains an anionic surfactant is added.

According to a ninth embodiment of the aqueous or non-aqueous solution or dispersion of a polythiophene or thiophene copolymer, according to the present invention, the aqueous or non-aqueous solution or dispersion of a polythiophene or thiophene copolymer further contains a non-ionic surfactant e.g. ethoxylated/fluroralkyl surfactants, polyethoxylated silicone surfactants, polysiloxane/polyether surfactants, ammonium salts of perfluro-alkylcarboxylic acids, polyethoxylated surfactants and fluorine-containing surfactants.

Suitable non-ionic surfactants include:

| | |
|---|---|
| Surfactant no. 01= | ZONYL ® FSN, a 40% by weight solution of $F(CF_2CF_2)_{1-9}CH_2CH_2O(CH_2CH_2O)_xH$ in a 50% by weight solution of isopropanol in water where x = 0 to about 25, from DuPont; |
| Surfactant no. 02= | ZONYL ® FSN-100: $F(CF_2CF_2)_{1-9}CH_2CH_2O(CH_2CH_2O)_xH$ where x = 0 to about 25, from DuPont; |
| Surfactant no. 03= | ZONYL ® FS300, a 40% by weight aqueous solution of a fluorinated surfactant, from DuPont; |
| Surfactant no. 04= | ZONYL ® FSO, a 50% by weight solution of a mixture of ethoxylated non-ionic fluoro-surfactant with the formula: $F(CF_2CF_2)_{1-7}CH_2CH_2O(CH_2CH_2O)_yH$ where y = 0 to ca. 15 in a 50% by weight solution of ethylene glycol in water, from DuPont; |
| Surfactant no. 05= | ZONYL ® FSO-100, a mixture of ethoxylated non-ionic fluoro-surfactant from DuPont with the formula: $F(CF_2CF_2)_{1-7}CH_2CH_2O(CH_2CH_2O)_yH$ where y = 0 to ca. 15 from DuPont; |
| Surfactant no. 06= | Tegoglide ® 410, a polysiloxane-polymer copolymer surfactant, from Goldschmidt; |
| Surfactant no. 07= | Tegowet ®, a polysiloxane-polyester copolymer surfactant, from Goldschmidt; |
| Surfactant no. 08= | FLUORAD ®FC431: $CF_3(CF_2)_7SO_2(C_2H_5)N$—$CH_2CO$—$(OCH_2CH_2)_nOH$ from 3M; |
| Surfactant no. 09= | FLUORAD ®FC126, a mixture of the ammonium salts of perfluorocarboxylic acids, from 3M; |
| Surfactant no. 10= | Polyoxyethylene-10-lauryl ether |
| Surfactant no. 11= | FLUORAD ®FC430, a 98.5% active fluoroaliphatic ester from 3M; |

Suitable anionic surfactants include:

| | |
|---|---|
| Surfactant no. 12= | ZONYL ® 7950, fluorinated surfactant from DuPont; |
| Surfactant no. 13= | ZONYL ® FSA, a 25% by weight solution of $F(CF_2CF_2)_{1-9}CH_2CH_2SCH_2CH_2COOLi$ in a 50% by weight solution of isopropanol in water from DuPont; |
| Surfactant no. 14= | ZONYL ® FSE, a 14% by weight solution of $[F(CF_2CF_2)_{1-7}CH_2CH_2O]_xP(O)(ONH_4)_y$ where x = 1 or 2; y = 2 or 1; and x + y = 3 in 70% by wt solution of ethylene glycol in water from DuPont; |
| Surfactant no. 15= | ZONYL ® FSJ, a 40% by weight solution of a blend of $F(CF_2CF_2)_{1-7}CH_2CH_2O]_xP(O)(ONH_4)_y$ where x = 1 or 2; y = 2 or 1; and x + y = 3 with a hydrocarbon surfactant in 25% by weight solution of isopropanol in water from DuPont; |
| Surfactant no. 16= | ZONYL ® FSP, a 35% by weight solution of $[F(CF_2CF_2)_{1-7}CH_2CH_2O]_xP(O)(ONH_4)_y$ where x = 1 or 2; y = 2 or 1 and x + y = 3 in 69.2% by weight solution of isopropanol in water, from DuPont; |
| Surfactant no. 17= | ZONYL ® UR: $[F(CF_2CF_2)_{1-7}CH_2CH_2O]_xP(O)(OH)_y$ where x = 1 or 2; y = 2 or 1 and x + y = 3, from DuPont; |
| Surfactant no. 18= | ZONYL ® TBS: a 33% by weight solution of $F(CF_2CF_2)_{3-8}CH_2CH_2SO_3H$ in a 4.5% by weight solution of acetic acid in water, from DuPont; |
| Surfactant no. 19= | ammonium salt of perfluoro-octanoic acid; |

Industrial Application

Aqueous solutions or dispersions of polythiophenes and thiophene polymers exhibit high electrical conductivity together with low absorption of visible light and high absorption to infrared radiation. Aqueous solutions or dispersions comprising aqueous solutions or dispersions of polythiophenes and thiophene copolymers can be applied to a wide variety of rigid and flexible substrates, e.g. ceramics, glass and plastics, and are particularly suitable for flexible substrates such as plastic sheeting and the substrates can be substantially bent and deformed without the polythiophene or thiophene copolymer layer losing its electrical conductivity.

Such polythiophenes and thiophene copolymers can, for example, be utilized in photovoltaic devices, batteries, capacitors and organic and inorganic electroluminescent devices, in electromagnetic shielding layers, in heat shielding layers, in antistatic coatings for a wide variety of products including photographic film, thermographic recording materials and photothermographic recording materials, in smart windows, in electrochromic devices, in sensors for organic and bio-organic materials, in field effect transistors, in printing plates, in conductive resin adhesives and in free-standing electrically conductive films [see also chapter 10 of the Handbook of Oligo- and Polythiophenes, Edited by D. Fichou, Wiley-VCH, Weinheim (1999)].

The invention is illustrated hereinafter by way of comparative and invention examples. The percentages and ratios given in these examples are by weight unless otherwise indicated.

The following supports were used in the COMPARATIVE and INVENTION EXAMPLES:

AUTOSTAT®=a 175 μm thick heat-stabilized poly(ethylene terephthalate) [PET] subbed on both sides supplied by AUTOTYPE INTERNATIONAL LTD;

175 μm thick heat-stabilized PET coated with subbing layer nr. 01.

Subbing layer Nr. 01 has the composition:

| | |
|---|---|
| copolymer of 88% vinylidene chloride, 10% methyl acrylate and 2% itaconic acid | 79.1% |
| Kieselsol ® 100F, a colloidal silica from BAYER | 18.6% |
| Mersolat ® H, a surfactant from BAYER | 0.4% |
| Ultravon ® W, a surfactant from CIBA-GEIGY | 1.9% |

The following layers were used in the COMPARATIVE and INVENTION EXAMPLES:
a layer of LUXPRINT™ 7153E (a high K dielectric insulator) screen printed through a P55 screen;
a layer of LUXPRINT™ 7138J (a white phosphor) screen printed through a P55 screen.

The following ingredients not mentioned above were used in the compositions of the COMPARATIVE and INVENTION EXAMPLES:

non-aqueous solvents:
 CA=carbitol acetate [di(ethyleneglycol) ethyl ether acetate]
 DEG=diethylene glycol
 PD=1,2-propandiol (propylene glycol)
 BuOH=n-butanol
GTMS=3-glycidoxytrimethoxysilane Preparation of 3,4-Alkylenedioxythiophene-homopolymers

COMPARATIVE EXAMPLE 1

At 25° C., 562.5 g of a 5.6% by weight aqueous solution of poly(styrenesulphonic acid) [PSS] (Mw=290,000), 2437.5 g of is deionized water and 12.78 g (90 mmol) of EDOT were mixed in a 4L reaction vessel equipped with a stirrer. The concentration of oxygen in this solution was 6.5 mg/L as measured with a Knick Process Unit 73 $O_2$, using InPro 6000 Series $O_2$ sensors. 0.225 g $Fe_2(SO_4)_3.H_2O$ and 25.7 g $Na_2S_2O_8$ were then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 mL Lewatit™ S100MB+500 mL Lewatit™ M600MB from BAYER). The resulting mixture was additionally thermally treated at 95° C. for 2 h and the resulting viscous mixture treated with high shear [microfluidizer at 60 MPa (600Bar)]. This procedure yielded 1800 g of a 1.09 wt % blue dispersion.

COMPARATIVE EXAMPLE 2

At 25° C., 562.5 g of a 5.6% by weight aqueous solution of poly(styrenesulphonic acid) [PSS] (Mw=290,000), 2437.5 g of deionized water and 12.78 g (900 mmol) of EDOT were mixed in a 4L reaction vessel equipped with a stirrer and an oxygen inlet. After bubbling oxygen through this mixture for 30 minutes, 12.78 g (90 mmol) of EDOT were added to this solution. The concentration of oxygen in this solution was 38.45 mg/L as measured with a Knick Process Unit 73 $O_2$, using InPro 6000 Series $O_2$. 0.225 g $Fe_2(SO_4)_3.9H_2O$ and 25.7 g $Na_2S_2O_8$ was then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 mL Lewatit™ S100MB+500 mL Lewatit™ M600MB from BAYER). The resulting mixture was additionally thermally treated at 95° C. for 2 h and the resulting viscous mixture treated with high shear [microfluidizer at 60 MPa (600Bar)]. This procedure yielded 1760 g of a 1.12 wt % blue dispersion.

INVENTION EXAMPLE 1

At room temperature, 438.23 g of a 5.99% by weight aqueous is solution of poly(styrenesulphonic acid) [PSS] (Mw=290,000) and 2061.77 g deionized water were mixed in a 4L reaction vessel equipped with a stirrer and a nitrogen inlet. After bubbling nitrogen through this mixture for 30 minutes, 12.78 g (90 mmol) of EDOT were added to this solution. The concentration of oxygen in this solution was 0.52 mg/L as measured with a Knick Process Unit 73 $O_2$, using InPro 6000 Series $O_2$. 0.225 g $Fe_2(SO_4)_3.9H_2O$ and 25.7 g $Na_2S_2O_8$ were then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 mL Lewatit™ S100MB+500 mL Lewatit™ M600MB). The resulting mixture was additionally thermally treated at 95° C. for 2 h and the resulting viscous mixture treated with high shear [microfluidizer at 60 MPa (600Bar)]. This procedure yielded 1950 g of a 1.02 wt % blue dispersion of PEDOT 1.

INVENTION EXAMPLE 2

At 25° C., 438.23 g of a 5.99% by weight aqueous solution of poly(styrenesulphonic acid) [PSS] (Mw=290,000) were mixed with 2061.77 g of deionized water in a 4L reaction vessel equipped with a stirrer and a nitrogen inlet. After bubbling nitrogen purging through this mixture for 30 minutes, 12.78 g (90 mmol) of EDOT was added. The concentration of oxygen in this solution was 2.66 mg/L as measured with a Knick Process Unit 73 $O_2$, using InPro 6000 Series $O_2$. 0.225 g $Fe_2(SO_4)_3.9H_2O$ and 25.7 g $Na_2S_2O_8$ were then added to initiate the polymerization reaction. The reaction mixture was stirred at 25° C. for 7 h, after which a further 4.3 g of $Na_2S_2O_8$ was added. After an additional reaction time of 16 h the reaction mixture was treated 2 times with ion exchanger (300 mL Lewatit™ S100MB+500 mL Lewatit™ M600MB from BAYER). The resulting mixture was additionally thermally treated at 95° C. for 2 h and the resulting viscous mixture was treated with high shear [microfluidizer at 60 MPa (600Bar)]. This procedure yielded 1840 g of a 1.03 wt % blue dispersion of PEDOT 2.

Characterization of PEDOT 1 and PEDOT 2

The molecular weights of PEDOT 1 and PEDOT 2 were determined by is aqueous gel permeation chromatography relative to sodium poly(styrenesulphonate) with UV-vis absorption detection at 785 nm. The molecular weights together with their concentrations in the aqueous dispersions are given in Table 1.

TABLE 1

| Polymer nr. | PEDOT/PSS concentration [wt %] | Molecular weight [785 nm] |
|---|---|---|
| PEDOT 1 | 1.02 | 490,000 |
| PEDOT 2 | 1.03 | 390,000 |

Preparing Electroconductive layers with Dispersions Based on the Dispersions of Comparative Examples 1 and 2 and Invention Examples 1 and 2

Coating dispersions were produced by adding 3-glycidoxypropyl-trimethoxysilane, ZONYL® FSO100, a copolymer latex of vinylidene chloride, methacrylate and itaconic acid (88/10/2) and N-methyl pyrrolidinone to the dispersions of COMPARATIVE EXAMPLES 1 and 2 and INVENTION EXAMPLES 1 and 2 so as to produce layers, upon doctor blade-coating onto a 175 μm poly(ethylene terephthalate) support with subbing layer 1 and drying at 45° C. for 3.5 minutes, with the following composition:

| | |
|---|---|
| PEDOT | 28.9 mg/m$^2$ |
| [PEDOT) / PSS | 100 mg/m$^2$] |
| ZONYL ® FSO100 | 8 mg/m$^2$ |
| 3-glycidoxypropyl-trimethoxysilane | 100 mg/m$^2$ |
| Copolymer latex of vinylidene chloride, methacrylate and itaconic acid (88/10/2) | 100 mg/m$^2$ |
| N-methyl pyrrolidinone | 2 mL/m$^2$ |

Characterization of Electroconductive Layers Prepared With Dispersions Based on the Dispersions of Comparative Examples 1 and 2 and Invention Examples 1 and 2

The optical density of the layers was determined by measuring a stack of 10 strips with a Macbeth® TD904 densitometer using a visible filter and then obtaining therefrom the optical density of a single strip. The values given in Table 2 include the optical density of the PET-support.

The surface resistance of the layers was measured in a room conditioned to a temperature of 25° C. and 30% relative humidity by contacting the printed layer with parallel copper electrodes each 35 mm long and 35 mm apart capable of forming line contacts, the electrodes being separated by a Teflon® insulator. This enabled a direct measurement of the surface resistance to be realized. The results are also given in Table 2.

The layers were then exposed to artificial sunlight (provided by a xenon lamp) through a glass filter in an Atlas Material Testing Technology BV, SUNTEST™ CPS apparatus according to DIN 54 004. The factor given in Table 2 is the ratio of surface resistance after x hours Suntest™ exposure to the surface resistance before the Suntest exposure.

TABLE 2

| Example | quantity of oxygen in reaction medium mg/L | PEDOT/ PSS concentration [wt %] | Initial surface resistance [Ohm/ square] | O.D. | Ratio of surface resistance after Subtest™ exposure to initial surface resistance | |
|---|---|---|---|---|---|---|
| | | | | | after 48 h exposure | after 96 h exposure |
| Comp 1 | 6.5 | 1.09 | 2900 | 0.067 | 83 | 11000 |
| Comp 2 | 38.45 | 1.11 | 21000 | 0.066 | 50 | 1646 |
| Inv 1 | 0.52 | 1.02 | 1200 | 0.066 | 13 | 157 |
| Inv 2 | 2.66 | 1.03 | 1200 | 0.065 | 12 | 151 |

The results in Table 2 show that the initial surface resistance and the stability of the PEDOT/PSS-layers is strongly dependent upon the quantity of oxygen in the reaction medium during the polymerization of 3,4-ethylenedioxythiophene in the presence of poly(styrenesulphonic acid), the lower the concentration of oxygen in the reaction medium the lower the surface resistance and the higher the stability to Suntest™ exposure -as shown by lower ratios of surface resistance after Suntest™ exposure to the initial surface resistance.

INVENTION EXAMPLE 3

At room temperature, 10.649 kg of a 4.93% by weight aqueous solution of poly(styrene sulphonic acid) [PSS] (Mw=290,000) and 39351 g deionized water were mixed in a 60L Büchi reaction vessel equipped with a stirrer (180 rpm) and a nitrogen inlet. After bubbling nitrogen through this mixture for 30 minutes, 213 g (1.5 mol) of EDOT was added to this solution. The reaction mixture was heated to 30° C. The concentration of oxygen in this solution was 0.08 mg/L as measured with a Knick Process Unit 73 $O_2$, using InPro 6000 Series $O_2$. 3.75 g $Fe_2(SO_4)_3$ $9H_2O$ and 428.2 g $Na_2S_2O_8$ were then added to initiate the polymerization reaction. The reaction mixture was stirred at 30° C. for 7 h, after which a further 71.6 g of $Na_2S_2O_8$ was added. After an additional reaction time of 16 h the reaction mixture was cooled to 25° C. and $N_2$-bubbling was stopped. The dispersion was treated 2 times with ion exchanger (5000 ml Lewatit™ S100MB+8320 ml Lewatit™ M600MB). The resulting mixture was additionally thermally treated at 95° C. for 2 h and the resulting viscous mixture (50730 g, 1.03 wt %) was first diluted with 14585 g of deionized water and secondly treated with high shear [microfluidizer at 40 MPa (400Bar)]. This procedure yielded 65.315 kg of PEDOT 3, a 0.82 wt % blue dispersion of PEDOT/PSS with a weight ratio of PEDOT to PSS of 1:2.46.

Application in Screen Printing Inks

INVENTION EXAMPLES 4 to 7

The starting compositions of INVENTION EXAMPLES 4 to 7 were prepared by mixing the solvent given in Table 3 in the quantity also given in Table 3 to the quantity of PEDOT 3 given in Table 3 and evaporating with stirring from the resulting mixtures by distillation using a water bath at the temperature given in Table 3 and a vacuum of 50 hPa (mbar) giving the compositions also given in Table 3.

TABLE 3

| Invention example Nr | mixture before dewatering | | quantity of PEDOT 3 [g] | Temperature of water bath [° C.] | (final) composition | | | |
|---|---|---|---|---|---|---|---|---|
| | non-aqueous solvent | | | | PEDOT/ PSS [wt %] | non-aqueous solvent | | water [wt %] |
| | type | quantity [g] | | | | type | quantity [wt. %] | |
| 4 | BuOH PD DEG | 2335 900 98 | 2333 | 60 | 2.74 | PD + DEG | 93.06 | 4.2 |
| 5 | BuOH PD DEG | 2335 900 98 | 2333 | 70 | 3.10 | PD + DEG | 94.70 | 2.2 |
| 6 | PD DEG | 900 98 | 2333 | 60 | 2.88 | PD + DEG | 91.02 | 6.1 |
| 7 | PD DEG | 900 98 | 2333 | 70 | 3.00 | PD + DEG | 94.50 | 2.5 |

The content of PEDOT in these compositions, obtained by dividing the content of PEDOT/PSS by 3.4, varied between 0.806 and 0.912% by weight.

These starting compositions for INVENTION EXAMPLES 4 to 7 were themselves screen printed through the screen given in Table 4 onto AUTOSTAT™ CT07 supports using a manually operated press and the resulting prints dried for 130° C. for 2 minutes.

The optical density of the print was determined using a MacBeth TR924 densitometer in transmission with blue, green, red and visible filters. The results are given in Table 4.

The surface resistance of the print was measured as described for COMPARATIVE EXAMPLES 1 and 2 and INVENTION EXAMPLES 1 and 2, the results being also given in Table 4.

The print quality was assessed as regards mottle as determined visually on a scale of 0 to 5, 0 corresponding to a good mottle-free layer, according to the following criteria:

| | |
|---|---|
| mottle assessment of 0: | no mottle observed upon visual inspection; |
| mottle assessment of 1: | mottle over between 1 and 10% of print; |
| mottle assessment of 2: | mottle over between 11 and 20% of print; |
| mottle assessment of 3: | mottle over between 21 and 40% of print; |
| mottle assessment of 4: | mottle over between 41 and 60% of print; |
| mottle assessment of 5: | mottle over more than 60% of the print. | and as regards comets (print defects in which a point defect has a trail behind it like a comet) visually on a scale of 0 to 5, 0 corresponding to a good comet-free layer, according to the following criteria:

| | |
|---|---|
| comet assessment of 0: | no comets observed upon visual inspection; |
| comet assessment of 1: | comets over between 0 and 1% of print; |
| comet assessment of 2: | comets over between 1.1 and 5% of print; |
| comet assessment of 3: | comets over between 5.1 and 10% of print; |
| comet assessment of 4: | comets over between 10.1 and 15% of print; |
| comet assessment of 5: | comets over more than 15% of the print. |

The print quality results and optical density measurements and surface resistance results are given in Table 4.

There was no significant difference in print properties for prints produced with starting materials produced by azeotropic evaporation of water with the water bath at 60° C. and those produced by azeotropic evaporation of water with the water bath at 70° C. Addition of alcohols, such as isopropanol or n-butanol, improved the print quality by reducing the mottle and presence of comets.

TABLE 4

| | Starting composition for Invention Example nr | | | |
|---|---|---|---|---|
| screen used | 4 P34 | 5 P34 | 6 P34 | 7 P34 |
| $D_{blue}$ | 0.29 | 0.32 | 0.29 | 0.29 |
| $D_{green}$ | 0.36 | 0.39 | 0.36 | 0.37 |
| $D_{red}$ | 0.47 | 0.52 | 0.48 | 0.49 |
| $D_{vis}$ | 0.30 | 0.34 | 0.31 | 0.31 |
| Mottle test | 3 | 3 | 3 | 3 |
| Comet test | 1 | 1 | 1 | 1 |
| Surface resistance [ohm/square] | 101 | 90 | 96 | 95 |

These starting compositions were then used for preparing the opaque compositions of INVENTION EXAMPLES 4 to 7 by adding the appropriate quantities of the ingredients given in Table 5, including the black pigment PIG07, to prepare 100 g of the compositions given therein.

TABLE 5

| | Composition of Invention Example [wt %] | | | |
|---|---|---|---|---|
| Ingredient | nr 4 | nr 5 | nr 6 | nr 7 |
| PEDOT | 0.733 | 0.830 | 0.771 | 0.803 |
| PEDOT/PSS | 2.494 | 2.822 | 2.622 | 2.731 |
| PD + DEG + BuOH | 88.546 | 88.218 | 88.418 | 88.309 |
| 3-glycidoxypropyltrimethoxysilane | 0.5 | 0.5 | 0.5 | 0.5 |
| ZONYL ® FSO100 | 0.25 | 0.25 | 0.25 | 0.25 |
| X50860A | 0.05 | 0.05 | 0.05 | 0.05 |
| binder 02 | 6.66 | 6.66 | 6.66 | 6.66 |
| PIG07 | 1.50 | 1.50 | 1.50 | 1.50 |

The opaque compositions of INVENTION EXAMPLES 4 to 7 were screen printed though the screen given in Table 6 using a manually operated screen press onto AUTOSTAT® CT7 supports and layers of LUXPRINT® 7138J and LUXPRINT™ 7153E and dried at 120° C. for 2 minutes for AUTOSTAT® CT7 and 130° C. for 5 minutes for layers of LUXPRINT® 7138J and LUXPRINT™ 7153E. The surface resistance and optical density and print quality was assessed as described above.

The print quality results and optical density measurements for prints on AUTOSTAT™ CT7 are given in Table 6 and the surface resistance results for prints on AUTOSTAT™ CT7, LUXPRINT 7138J and LUXPRINT™ 7153E are also given in Table 6.

TABLE 6

|  | Opaque composition of Invention Example nr | | | |
|---|---|---|---|---|
| screen used | 4<br>P34 | 5<br>P34 | 6<br>P34 | 7<br>P34 |
| on Autostat ® CT7 | | | | |
| $D_{blue}$ | 1.57 | 1.52 | 1.28 | 1.42 |
| $D_{green}$ | 1.54 | 1.47 | 1.26 | 1.35 |
| $D_{red}$ | 1.52 | 1.45 | 1.25 | 1.37 |
| $D_{vis}$ | 1.54 | 1.46 | 1.26 | 1.39 |
| mottle test | 1 | 1 | 2 | 2 |
| comet test | 1 | 1 | 2 | 2 |

TABLE 6-continued

|  | Opaque composition of Invention Example nr | | | |
|---|---|---|---|---|
| screen used | 4<br>P34 | 5<br>P34 | 6<br>P34 | 7<br>P34 |
| Surface resistance in ohm/square | | | | |
| Autostat ® CT7 | 205 | 211 | 209 | 274 |
| Luxprint ® 7138J | 176 | 177 | 161 | 226 |
| Luxprint ® 7153E | 269 | 262 | 211 | 300 |

The print properties were satisfactory on all three surfaces evaluated.

INVENTION EXAMPLES 8 to 19

The starting compositions of INVENTION EXAMPLES 8 to 19 were prepared by mixing the solvent given in Table 7 in the quantity also given in Table 7 to the quantity of PEDOT 3 given in Table 7 and evaporating with stirring from the resulting mixtures by distillation using a water bath at 60° C. and a vacuum of 50 hPa (mbar) giving the compositions also given in Table 7.

TABLE 7

| mixture before dewatering | | | starting composition | | |
|---|---|---|---|---|---|
| non-aqueous solvent | | quantity of | PEDOT/PSS | non-aqueous solvent | | water |
| type | quantity [kg] | PEDOT 3 [kg] | [wt %] | type | quantity [wt. %] | [wt %] |
| PD<br>DEG | 9.765<br>1.085 | 44.310 | 3.0 | PD +<br>DEG | 91.5 | 5.5 |

This starting composition was used for preparing the opaque compositions of INVENTION EXAMPLES 8 to 19 by adding the appropriate quantities of the ingredients given in Table 8, including various black pigments, to prepare 100 g of the compositions given therein. 3-glycidoxypropyltrimethoxysilane, ZONYL® FSO100 and X50860A were first added to the starting composition with stirring followed by the pigment and binder 02 with stirring, except in the cases of INVENTION EXAMPLES 13 and 14. In the case of the paste of INVENTION EXAMPLE 17 binder 22 was the final ingredient to be added with stirring.

TABLE 8

| Ingre-<br>dient | Composition of Invention Example Nr [wt %] | | | | | | | | | | | |
|---|---|---|---|---|---|---|---|---|---|---|---|---|
|  | 8 | 9 | 10 | 11 | 12 | 13 | 14 | 15 | 16 | 17 | 18 | 19 |
| PEDOT | 0.76 | 0.74 | 0.74 | 0.76 | 0.77 | 0.78 | 0.77 | 0.77 | 0.77 | 0.75 | 0.74 | 0.73 |
| PEDOT/PSS | 2.66 | 2.60 | 2.60 | 2.66 | 2.69 | 2.73 | 2.69 | 2.69 | 2.69 | 2.63 | 2.60 | 2.55 |
| PD + DEG | 81.01 | 79.46 | 79.46 | 81.20 | 81.92 | 83.30 | 81.92 | 81.92 | 81.92 | 80.10 | 79.46 | 77.72 |
| GTMS | 0.5 | 0.5 | 0.5 | 0.5 | 0.5 | 0.5 | 0.5 | 0.5 | 0.5 | 0.5 | 0.5 | 0.5 |
| ZONYL ® FSO100 | 0.25 | 0.25 | 0.25 | 0.25 | 0.25 | 0.25 | 0.25 | 0.25 | 0.25 | 0.25 | 0.25 | 0.25 |
| X50860A | 0.05 | 0.05 | 0.05 | 0.05 | 0.05 | 0.05 | 0.05 | 0.05 | 0.05 | 0.05 | 0.05 | 0.05 |
| binder 02 | 6.66 | 6.66 | 6.66 | 6.66 | 6.66 | 6.66 | 6.66 | 6.66 | 6.66 | 6.66 | 6.66 | 6.66 |
| binder 22 | — | — | — | — | — | — | — | — | — | 2.0 | — | — |
| PIG07 | — | — | — | — | 1.5 | 3.0 | 3.0 | 3.0 | 3.0 | — | — | — |
| PIG10 | 4.0 | — | — | — | — | — | — | — | — | — | — | — |
| PIG11 | — | 5.7 | — | — | — | — | — | — | — | — | — | — |
| PIG12 | — | — | 5.7 | — | — | — | — | — | — | — | — | — |
| PIG13 | — | — | — | 3.8 | — | — | — | — | — | — | — | — |
| PIG14 | — | — | — | — | 3.0 | — | — | — | — | — | — | — |

TABLE 8-continued

| Ingredient | Composition of Invention Example Nr [wt %] | | | | | | | | | | | |
|---|---|---|---|---|---|---|---|---|---|---|---|---|
| | 8 | 9 | 10 | 11 | 12 | 13 | 14 | 15 | 16 | 17 | 18 | 19 |
| PIG15 | — | — | — | — | — | — | — | — | — | — | 5.7 | — |
| PIG16 | — | — | — | — | — | — | — | — | — | — | — | 7.6 |
| deionized water | 4.87 | 4.78 | 4.78 | 4.88 | 4.93 | 5.01 | 4.93 | 4.93 | 4.93 | 4.81 | 4.78 | 4.67 |

The opaque compositions of INVENTION EXAMPLES 8 to 19 were all slightly viscous with the exception of INVENTION EXAMPLE 12, which was a little more viscous. These opaque compositions were all allowed to stand at least overnight before screen printing through the screen given in Table 9 using a manually operated screen press onto AUTOSTAT® CT7 supports and layers of LUXPRINT® 7138J and LUXPRINT™ 7153E and dried at 130° C. for 2 minutes for AUTOSTAT® CT7 and 130° C. for 5 minutes for layers of LUXPRINT® 7138J and LUXPRINT™ 7153E. The surface resistance and optical density and print quality was assessed as described for INVENTION EXAMPLES 3 to 7.

The print quality results and optical density measurements for prints on AUTOSTAT™ CT7 are given in Table 9 and the surface resistance results for prints on AUTOSTAT™ CT7, LUXPRINT 7138J and LUXPRINT™ 7153E are also given in Table 9.

The print properties were satisfactory on all three surfaces evaluated.

Preparation of PEDOT/PSS With Different PSS:PEDOT Ratios

EXAMPLE 20

The quantity of poly(styrene sulphonic acid) [PSS] (Mw= 290,000) solution given in Table 10 was mixed with the quantity of deionized water given for the particular PEDOT-type in Table 10 at 25° C. in the appropriate reaction vessel equipped with a stirrer and a nitrogen inlet. After bubbling nitrogen through this mixture for 30 minutes, the quantity of EDOT for the particular PEDOT-type given in Table 10 was then added to this solution. The concentration of oxygen in this solution was <1.0 mg/L as measured with a Knick Process Unit 73 $O_2$, using InPro 6000 Series $O_2$. The quantities of $Fe_2(SO_4)_3 \cdot 9H_2O$ and $Na_2S_2O_8$ corresponding to concentrations of 0.13 mM and 41.6 mM respectively were then added to initiate the polymerization reaction. The concentration of EDOT in the reaction mixtures was 30 mM

TABLE 9

| | Opaque composition of Invention Example nr | | | | | | | | | | | |
|---|---|---|---|---|---|---|---|---|---|---|---|---|
| | 8 | 9 | 10 | 11 | 12 | 13 | 14 | 15 | 16 | 17 | 18 | 19 |
| screen used on Autostat® CT7 | P34 | P34 | P34 | P34 | P34 | P34 | P34 | P34 | P34 | P34 | P34 | P34 |
| $D_{blue}$ | 0.70 | 1.71 | 2.03 | 0.36 | 2.84 | 0.98 | 1.65 | 1.87 | 2.22 | 2.20 | 2.85 | 0.94 |
| $D_{green}$ | 0.75 | 1.66 | 1.97 | 0.43 | 2.71 | 0.99 | 1.62 | 1.85 | 2.16 | 2.04 | 2.64 | 0.94 |
| $D_{red}$ | 0.83 | 1.64 | 1.88 | 0.52 | 2.62 | 1.05 | 1.62 | 1.87 | 2.16 | 2.01 | 2.57 | 0.98 |
| $D_{vis}$ | 0.71 | 1.67 | 1.97 | 0.38 | 2.77 | 0.97 | 1.62 | 1.85 | 2.18 | 2.07 | 2.77 | 0.93 |
| mottle test | 3 | 3–4 | 3 | 3 | 0 | 3 | 2 | 1 | 1 | 3 | 0 | 4 |
| comet test | 2 | 1–2 | 2–3 | 0–1 | 1 | 1 | 2–3 | 1 | 1 | 4 | 0–1 | 1–2 |
| Surface resistance in ohm/square | | | | | | | | | | | | |
| Autostat® CT7 | 98 | 106 | 115 | 100 | 91 | 94 | 94 | 94 | 84 | 113 | 114 | 121 |
| Luxprint® 7138J | — | 104 | 99 | — | 89 | 88 | 83 | 86 | 77 | 94 | 104 | — |
| Luxprint® 7153E | — | 114 | 124 | — | 92 | 95 | 104 | 98 | 89 | 108 | 113 | — | and that of PSS was 57 mM. The reaction mixtures were then stirred at 25° C. for 7 h, after which a further quantity of $Na_2S_2O_8$ for the particular PEDOT-type was added corresponding to a concentration of 6.95 mM. After an additional reaction time of 16 h the reaction mixtures were treated twice with ion exchanger (300 mL Lewatit™ S100MB+500 mL Lewatit™ M600MB). The resulting mixtures were further thermally treated at 950° C. for 2 h and the resulting viscous mixture treated with high shear [microfluidizer at 60 MPa (600 Bar)].

TABLE 10

| PEDOT type | EDOT weight [g] | PSS weight of solution [g] | PSS solution concentration [% by weight] | iron[III] sulphate nonahydrate weight [g] | $Na_2S_2O_8$ initially added [g] | $Na_2S_2O_8$ added after 7 h [g] | Water weight [g] |
|---|---|---|---|---|---|---|---|
| 4 | 12.78 | 438.23 | 5.99 | 0.225 | 25.7 | 4.3 | 2061.77 |
| 5 | 12.78 | 438.23 | 5.99 | 0.225 | 25.7 | 4.3 | 2061.77 |

Preparation and Characterization of Electroconductive Layers of Type 1 With Dispersions Based on the Dispersions of Example 2

Coating dispersions were produced by adding 3-glycidoxypropyl-trimethoxysilane, ZONYL® FSO100, a copolymer latex of vinylidene chloride, methacrylate and itaconic acid (88/10/2) and N-methyl pyrrolidinone to the dispersions of EXAMPLE 20 so as to produce layers of type 1, upon doctor blade-coating onto a 175 μm poly(ethylene terephthalate) support with subbing layer 1 and drying at 45° C. for 3.5 minutes, with the following composition:

| | |
|---|---|
| PEDOT | 28.9 mg/m² |
| [PEDOT) /PSS | 100 mg/m² |
| ZONYL ® PSO100 | 8 mg/m² |
| 3-glycidoxypropyl-trimethoxysilane | 100 mg/m² |
| Copolymer latex of vinylidene chloride, methacrylate and itaconic acid (88/10/2) | 100 mg/m² |
| N-methyl pyrrolidinone | 2 mL/m² |

Characterization of Electroconductive Layers Prepared With Dispersions Based on the Dispersions of Example 20

The optical density of the layers was determined by measuring a stack of 10 strips with a Macbeth® TD904 densitometer using a visible filter and then obtaining therefrom the optical density of a single strip. The values given in Table 11 include the optical density of the PET-support.

The surface resistance of the layers was measured in a room conditioned to a temperature of 25° C. and 30% relative humidity as described for COMPARATIVE EXAMPLES 1 and 2 and INVENTION EXAMPLES 1 and 2, the results also being given in Table 11.

The type 1 layers were then exposed to artificial sunlight (provided by a xenon lamp) through a glass filter in an Atlas Material Testing Technology BV, SUNTEST™ CPS apparatus according to DIN 54 004. The factor given in Table 11 is the ratio of surface resistance after x hours Suntest™ exposure to the surface resistance before the Suntest exposure.

TABLE 11

| PEDOT type | quantity of PEDOT/PSS dispersion [mL] | PEDOT/PSS concentration [wt %] | Initial surface resistance [Ohm/square] | O.D. | Ratio of surface resistance after Suntest™ exposure to initial surface resistance after 48 h exposure |
|---|---|---|---|---|---|
| 4 | 1950 | 1.02 | 1200 | 0.066 | 13 |
| 5 | 1840 | 1.03 | 1200 | 0.065 | 12 |

The results in Table 11 show that the initial resistance is reduced and the stability improved of layers containing PEDOT/PSS produced in the substantial absence of oxygen, according to the present invention over those of COMPARATIVE EXAMPLES 1 and 2 containing PEDOT/PSS produced in the presence of oxygen (see Table 2).

EXAMPLE 21

The quantity of poly(styrene sulphonic acid)[PSS] (Mw=290,000) solution given in Table 12 was mixed with the quantity of deionized water given for the particular PEDOT-type in Table 12 at 25° C. in the appropriate reaction vessel equipped with a stirrer and a nitrogen inlet. After bubbling nitrogen through this mixture for 30 minutes, the quantity of EDOT for the particular PEDOT-type given in Table 12 was then added to this solution, giving a EDOT-conentration of 30 mM. The concentration of oxygen in this solution was <1.0 mg/L as measured with a Knick Process Unit 73 $O_2$, using InPro 6000 Series $O_2$. The quantities of $Fe_2(SO_4)_3 \cdot 9H_2O$ and $Na_2S_2O_8$ corresponding to concentrations of 0.13 and 41.6 mM respectively were then added to initiate the polymerization reaction. The concentration of EDOT in the reaction mixtures was 30 mM and that of PSS was 23 mM for PEDOT-types 6 and 7, 36 mM for PEDOT-types 8 and 9, 57 mM for PEDOT-types 10 and 11, 74 mM for PEDOT-types 12 and 13 and 149 mM for PEDOT-types 14 to 17. The reaction mixtures were then stirred at 25° C. for 7 h, after which a further quantity of $Na_2S_2O_8$ for the particular PEDOT-type was added corresponding to a concentration of 6.95 mM. After an additional reaction time of 16 h the reaction mixtures were treated twice with ion exchanger (300 mL Lewatit™ S100MB+500 mL Lewatit™ M600MB). The resulting mixtures were further thermally treated at 95° C. for 2 h and the resulting viscous mixture treated with high shear [microfluidizer at 60 MPa (60OBar)].

TABLE 12

| PEDOT type | EDOT weight [g] | PSS solution concentration [mM] | PSS solution concentration [% by weight] | iron[III] sulphate nonahydrate weight [g] | $Na_2S_2O_8$ initially added [g] | $Na_2S_2O_8$ added after 7 h [g] | Water weight [g] |
|---|---|---|---|---|---|---|---|
| 6 | 10.65 | 23 | 4.81 | 0.187 | 21.4 | 3.58 | 2280.87 |
| 7 | 10.65 | 23 | 4.81 | 0.187 | 21.4 | 3.58 | 2280.87 |
| 8 | 10.65 | 36 | 4.81 | 0.187 | 21.4 | 3.58 | 2152.25 |
| 9 | 10.65 | 36 | 4.81 | 0.187 | 21.4 | 3.58 | 2152.25 |
| 10 | 10.65 | 57 | 5.99 | 0.187 | 21.4 | 3.58 | 2061.77 |
| 11 | 10.65 | 57 | 5.99 | 0.187 | 21.4 | 3.58 | 2061.77 |
| 12 | 10.65 | 74 | 4.81 | 0.187 | 21.4 | 3.58 | 1788.2 |
| 13 | 10.65 | 74 | 4.81 | 0.187 | 21.4 | 3.58 | 1788.2 |
| 14 | 8.52 | 149 | 4.81 | 0.149 | 17.1 | 2.86 | 862.11 |
| 15 | 8.52 | 149 | 4.81 | 0.149 | 17.1 | 2.86 | 862.11 |
| 16 | 213 | 149 | 4.90 | 3.75 | 428.2 | 71.6 | 22092.7 |
| 17 | 213 | 149 | 4.90 | 3.75 | 428.2 | 71.6 | 22092.7 |
| 18* | 213 | 149 | 4.90 | 3.75 | 428.2 | 71.6 | 22092.7 |

*same conditions as for PEDOT type 17 except that no thermal treatment at 95° C. for 2 h was carried out The resulting PSS:PEDOT weight and molar ratios, PEDOT/PSS-concentrations, viscosity as measured in an Ubbelohde viscometer in a bath thermostatted at 25° C., the peak particle sizes in the bimodal size distribution and the number of particles per mL with a particle size greater than 1 μn are given in Table 13.

TABLE 13

| PEDOT type | PSS/PEDOT weight ratio | PSS/PEDOT molar ratio | PEDOT/PSS-conc [% by wt] | viscosity cP | Peak particle size before/after homogenization [nm] | # part/ mL > 1 μm |
|---|---|---|---|---|---|---|
| 6 | 0.98 | 0.76 | 0.73 | 226 | 1086/47 | $4.7 \times 10^7$ |
| 7 | 0.98 | 0.76 | 0.65 | 120 | 1076/45 | $1.6 \times 10^7$ |
| 8 | 1.55 | 1.20 | 0.86 | 225 | 1042/44 | $1.7 \times 10^7$ |
| 9 | 1.55 | 1.20 | 0.82 | 150 | 973/42 | $2 \times 10^7$ |
| 10 | 1.96 | 1.51 | 0.96 | — | 910/43 | $1.4 \times 10^8$ |
| 11 | 2.46 | 1.90 | 0.03 | 240 | 647/68 | $4.8 \times 10^7$ |
| 12 | 3.18 | 2.45 | 1 | 64 | 759/33 | $3.6 \times 10^7$ |
| 13 | 3.18 | 2.45 | 0.93 | 60 | 734/32 | $3.2 \times 10^7$ |
| 14 | 6.36 | 4.91 | 1.83 | 94 | 493/27 | $2.9 \times 10^7$ |
| 15 | 6.36 | 4.91 | 1.89 | 118 | 560/26 | $3.3 \times 10^7$ |
| 16 | 6.42 (50L) | 4.96 | 1.55 | 59 | /26 | $1.1 \times 10^6$ |
| 17 | 6.42 (50L-UT) | 4.96 | 1.66 | 53 | /23 | $1.2 \times 10^6$ |
| 18 | no thermal treatment | 4.96 | 1.32 | 59 | /18 | $1.5 \times 10^6$ |

Preparation and Characterization of Electroconductive Layers of Type 1 With Dispersions Based on the Dispersions of Example 21

The electroconductive layers of type 1 with dispersions based on the dispersions of EXAMPLE 21 were prepared and characterized as described for the dispersions of EXAMPLE 15. The results are given in Table 14 for the type 1 electroconductive layers.

TABLE 14

| PEDOT type | PSS/PEDOT weight ratio | PSSA/PEDOT molar ratio | surface resistance [Ohm/square] | OD incl. support |
|---|---|---|---|---|
| 6 | 0.98 | 0.76 | 3000 | 0.061 |
| 7 | 0.98 | 0.76 | 3300 | 0.062 |
| 8 | 1.55 | 1.20 | 1700 | 0.065 |
| 9 | 1.55 | 1.20 | 1600 | 0.065 |
| 10 | 1.96 | 1.51 | 1000 | 0.066 |
| 11 | 2.46 | 1.90 | 1100 | 0.065 |
| 12 | 3.18 | 2.45 | 870 | 0.063 |
| 13 | 3.18 | 2.45 | 770 | 0.065 |
| 14 | 6.36 | 4.91 | 730 | 0.064 |
| 15 | 6.36 | 4.91 | 720 | 0.065 |
| 16 | 6.42 (50 L) | 4.96 | 640 | 0.066 |
| 17 | 6.42 (50 L-UT) | 4.96 | 640 | 0.065 |
| 18 | no thermal treatment | 4.96 | 690 | 0.067 |

The results in Table 14 surprisingly show that the surface resistance decreased with increasing PSS:PEDOT ratio for layers containing PEDOT/PSS produced in the substantial absence of oxygen, according to the present invention. This is at variance with the data available in the literature for PEDOT/PSS which shows that the surface resistance increases with increasing PSS:PEDOT ratio, see, for example, the paper published in 1999 by M. Lefebvre et al. in Chem. Mater., volume 11, pages 262–268, which reported PEDOT/PSS prepared from aqueous and acetonitrile (AN) solutions of EDOT and NaPPS with PSS to PEDOT ratios ranging from 0.24 to 3.33.

| Solvent used | PSS:PEDOT ratio obtained | Initial conductivity [S cm$^{-1}$] |
|---|---|---|
| AN/water | 0.48 | 1.3 |
| AN/water | 0.67 | 1.0 |
| AN/water | 0.71 | 1.5 |
| AN/water | 0.91 | 0.3 |
| AN/water | 1.0 | 2.5 |
| AN/water | 3.33 | $6 \times 10^{-3}$ |
| water | 0.24 | 9.9 |
| water | 2.0 | 0.3 |
| water | 2.5 | 0.4 |

EXAMPLE 22

The quantity of poly(styrene sulphonic acid)[PSS] (VERSA TL77 from ALCO with Mn=25,000 and Mw=72,000) solution given in Table 15 was mixed with the quantity of deionized water given for the particular PEDOT-type in Table 15 at 25° C. in the appropriate reaction vessel equipped with a stirrer and a nitrogen inlet. After bubbling nitrogen through this mixture for 30 minutes, the quantity of EDOT for the particular PEDOT-type given in Table 15 was then added to this solution, giving a EDOT-concentration of 30 mM. The concentration of oxygen in this solution was <1.0 mg/L as measured with a Knick Process Unit 73 $O_2$, using InPro 6000 Series $O_2$. The quantities of $Fe_2(SO_4)_3 \cdot 9H_2O$ and $Na_2S_2O_8$ corresponding to concentrations of 0.13 and 41.6 mM respectively were then added to initiate the polymerization reaction. The concentration of EDOT in the reaction mixtures was 30 mM and that of PSS was 46 mM for PEDOT-type 19, 57 mM for PEDOT-type 20, 57 mM for PEDOT-type 21, 69 mM for PEDOT-type 22, and 93 mM for PEDOT-type 23. The reaction mixtures were then stirred at 25° C. for 7 h, after which a further quantity of $Na_2S_2O_8$ for the particular PEDOT-type was added corresponding to a concentration of 6.94 mM. After an additional reaction time of 16 h the reaction mixtures were treated twice with ion exchanger (300 mL Lewatit™ S100MB+500 mL Lewatit™ M600MB). The resulting mixtures were further thermally treated at 95° C. for 2 h and the resulting viscous mixture treated with high shear [microfluidizer at 60 MPa (600Bar)].

TABLE 15

| PEDOT type | EDOT weight [g] | PSS weight [g] | PSS solution concentration [% by weight] | iron[III] sulphate nonahydrate weight [g] | $Na_2S_2O_8$ initially added [g] | $Na_2S_2O_8$ added after 7 h [g] | Water weight [g] |
|---|---|---|---|---|---|---|---|
| 19 | 8.52 | 17.04 | 4.01 | 0.149 | 17.13 | 2.86 | 1575.07 |
| 20 | 8.52 | 21.00 | 4.01 | 0.149 | 17.13 | 2.86 | 1476.31 |
| 21 | 8.52 | 21.00 | 4.01 | 0.149 | 17.13 | 2.86 | 1476.31 |
| 22 | 8.52 | 25.56 | 4.01 | 0.149 | 17.13 | 2.86 | 1362.6 |
| 23 | 8.52 | 34.08 | 4.01 | 0.149 | 17.13 | 2.86 | 1150.07 |

The resulting PSS:PEDOT weight and molar ratios, PEDOT/PSS-concentrations, viscosity as measured in an Ubbelohde viscometer in a bath thermostatted at 25° C., the peak particle sizes in the bimodal size distribution and the number of particles per mL with a particle size greater than 1 µm are given in Table 16.

TABLE 16

| PEDOT type | PSS/PEDOT weight ratio | PSS/PEDOT molar ratio | PEDOT/PSS-conc [% by wt] | viscosity cP | Peak particle size before/after homogenization [nm] | # part/ mL > 1 µm |
|---|---|---|---|---|---|---|
| 19 | 2.00 | 1.54 | 0.93 | 240 | 983/67 | $8.2 \times 10^5$ |
| 20 | 2.46 | 1.90 | 1.21 | 10 | 1249/101 | $7.9 \times 10^5$ |
| 21 | 2.46 | 1.90 | 1.22 | 50 | 1224/98 | $7.2 \times 10^5$ |
| 22 | 3.00 | 2.32 | 1.35 | 31 | 1062/87 | $8.0 \times 10^5$ |
| 23 | 4.00 | 3.09 | 1.75 | 57 | 126/83 | $8.4 \times 10^5$ |

Preparation and Characterization of Electroconductive Layers of Type 1 With Dispersions Based on the Dispersions of Example 22

The electroconductive layers of type 1 with dispersions based on the dispersions of EXAMPLE 22 were prepared and characterized as described for the dispersions of EXAMPLE 20. The results are given in Table 17 for the type 1 electroconductive layers.

TABLE 17

| PEDOT type | PSSA/PEDOT weight ratio | PSSA/PEDOT molar ratio | surface resistance [Ohm/square] | OD incl. support |
|---|---|---|---|---|
| 19 | 2.00 | 1.54 | 3300 | 0.059 |
| 20 | 2.46 | 1.90 | 1900 | 0.063 |
| 21 | 2.46 | 1.90 | 1700 | 0.063 |
| 22 | 3.00 | 2.32 | 1500 | 0.062 |
| 23 | 4.00 | 3.09 | 1300 | 0.062 |

The results in Table 17 confirm the results in Table 14 surprisingly showing that the surface resistance decreased with increasing PSS:PEDOT ratio for layers containing PEDOT/PSS produced in the substantial absence of oxygen, according to the present invention.

Synthesis of Co-monomers

Synthesis of 2-acetoxymethyl-2,3-dihydro-thieno[3,4-b][1,4]dioxine-5,7-dicarboxylic acid dimethyl ester

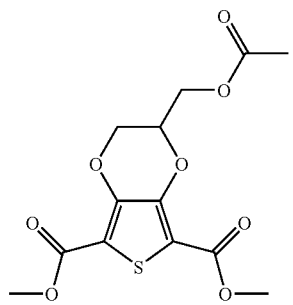

A 70/30 molar mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester was obtained by performing the reaction between 3,4-dihydroxythiophene-2,5-dicarboxylic acid dimethyl ester and epibromohydrin as described in U.S. Pat. No. 5,111,327. This mixture was subsequently separated by an acetylation/selective crystallization procedure: the 70/30 molar mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester (143 g, 0.496 mol) was dissolved in methylene chloride (1.5 L). Triethylamine (80 mL) was subsequently added after which acetyl chloride (43 mL) was added dropwise, constantly keeping the reaction around 25° C. by slight cooling. After addition the mixture was stirred for another hour at 25° C.

Subsequently, the reaction mixture was washed several times with 1M hydrochloric acid, a 1M aqueous solution of sodium hydrogen carbonate and a saturated aqueous solution of sodium chloride, respectively. The solvent was removed and the resulting solid was recrystallized from ethanol. After filtration and washing of the residue, pure 2-acetoxymethyl-2,3-dihydro-thieno[3,4-b][1,4]dioxine-5,7-dicarboxylic acid dimethyl ester was obtained as demonstrated by NMR and mass spectroscopy.

Synthesis of 3-acetoxy-3,4-dihydro-2H-thieno[3,4-b][1,4]dioxepine-6,8-dicarboxylic acid dimethyl ester

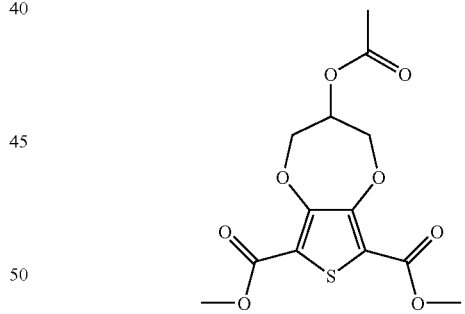

Its seven-membered ring isomer, 3-acetoxy-3,4-dihydro-2H-thieno[3,4-b][1,4]dioxepine-6,8-dicarboxylic acid dimethyl ester, could be isolated by concentrating the filtrate of the above-mentioned recrystallization process. The remaining residue, being a mixture of 2-acetoxymethyl-2,3-dihydro-thieno[3,4-b][1,4]dioxine-5,7-dicarboxylic acid dimethyl ester and 3-acetoxy-3,4-dihydro-2H-thieno[3,4-b][1,4]dioxepine-6,8-dicarboxylic acid dimethyl ester (molar ration ca. 1:2) was subsequently separated into the individual compounds by column chromatography using $SiO_2$ (eluant: $CH_2Cl_2$/ethylacetate=90/10). This finally resulted in pure 3-acetoxy-3,4-dihydro-2H-thieno[3,4-b][1,4]dioxepine-6,8-dicarboxylic acid dimethyl ester as well as some additional pure 2-acetoxymethyl-2,3-dihydro-thieno[3,4-b][1,4]dioxine-5,7-dicarboxylic acid dimethyl ester.

Synthesis of 2-hydroxymethyl-2,3-dihydro-thieno[3,4-b][1,4]dioxine-5,7-dicarboxylic acid

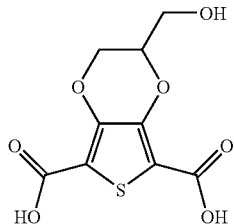

2-Acetoxymethyl-2,3-dihydro-thieno[3,4-b][1,4]dioxine-5,7-dicarboxylic acid dimethyl ester (60 g, 0.18 mol) was dissolved in ethanol (680 mL). Potassium hydroxide (36 g) was added to this solution after which water (500 mL) was added upon continuous cooling. After addition of the water the reaction mixture was stirred for another 30 minutes after which the solvents were removed by distillation. To the remaining part of the reaction mixture, we dropwise added a mixture of ice (50 g) and concentrated hydrochloric acid (25 mL), and stirred. The mixture was then filtered and the residue was washed with water. Subsequent drying resulted in quantitative formation of pure 2-hydroxymethyl-2,3-dihydro-thieno[3,4-b][1,4]dioxine-5,7-dicarboxylic acid as demonstrated by NMR and mass spectroscopy.

Synthesis of 3-hydroxy-3,4-dihydro-2H-thieno[3,4-b][1,4]dioxepine-6,8-dicarboxylic acid

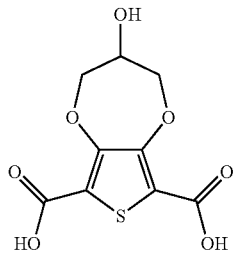

Pure 3-hydroxy-3,4-dihydro-2H-thieno [3,4-b][1,4]dioxepine-6,8-dicarboxylic acid was prepared analogously to the synthesis of 2-hydroxymethyl-2,3-dihydro-thieno[3,4-b][1,4]dioxine-5,7-dicarboxylic acid as described above and applying the same molar quantities of reagents.

Synthesis of (2,3-dihydro-thieno[3,4-b][1,4]dioxin-2-yl)-methanol (M1)

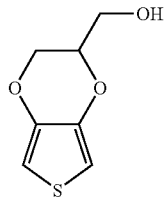

2-Hydroxymethyl-2,3-dihydro-thieno[3,4-b][1,4]dioxine-5,7-dicarboxylic acid (48 g, 0.184 mol) was dissolved in N,N-dimethylacetamide (500 mL), and $Cu_2Cr_2O_7$ (8.6 g) and quinoline (15 drops) were added. This mixture was subsequently stirred for 2 hours at 150° C., after which it was cooled to 25° C. It was then poured into ethyl acetate, the catalyst was removed by filtration and the filtrate was washed with acidic water and a saturated aqueous solution of sodium chloride. Subsequently, the solvent was removed after which pure (2,3-dihydro-thieno [3,4-b][1,4]dioxin-2-yl)-methanol was isolated by vacuum distillation (115–120° C.; 0.05 mm Hg).

Synthesis of 3,4-dihydro-2H-thieno[3,4-b][1,4]dioxepin-3-ol (M2)

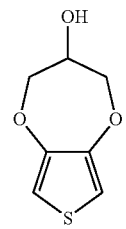

Pure 3,4-dihydro-2H-thieno[3,4-b][1,4]dioxepin-3-ol was prepared analogously to the synthesis of (2,3-dihydro-thieno [3,4-b][1,4]dioxin-2-yl)-methanol as described above and applying the same molar quantities of reagents. Purification was accomplished by column chromatography with $SiO_2$ (eluant: $CH_2Cl_2$).

Synthesis of (2,3-dihydro-thieno[3,4-b][1,4]dioxin-2-ylmethoxy)-acetic acid ethyl ester (M3)

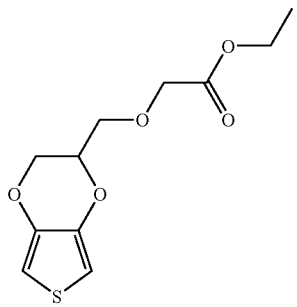

(2,3-Dihydro-thieno[3,4-b][1,4]dioxin-2-yl)-methanol (6.9 g, 40 mmol) was dissolved into tetrahydrofuran (100 mL), blanketed by nitrogen. Sodium hydride (1.9 g) was added in portions after which the reaction mixture was stirred for another 30 min. Then ethyl bromoacetate (5.3 mL) was added dropwise and stirring was continued for another hour at 25° C. The reaction mixture was then poured into ethyl acetate, washed with 1M hydrochloric acid, washed with a 1M aqueous solution of sodium hydrogen carbonate and concentrated. This resulted in quantitative formation of pure (2,3-dihydro-thieno[3,4-b][1,4]dioxin-2-ylmethoxy)-acetic acid ethyl ester as demonstrated by NMR and mass spectroscopy.

Synthesis of (2,3-dihydro-thieno[3,4-b][1,4]dioxin-2-yl-methoxy)-acetic acid (M4)

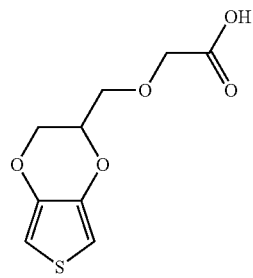

(2,3-Dihydro-thieno[3,4-b][1,4]dioxin-2-ylmethoxy)-acetic acid ethyl ester (10.2 g, 40 mmol) was dissolved into ethanol (100 mL) and water (50 mL), blanketed by nitrogen. Potassium hydroxide (2.9 g) was added and the mixture was heated at 35° C. for 30 min. The solvents were then removed by distillation, is ethyl acetate (50 mL), ice-water (50 mL) and concentrated hydrochloric acid (5 mL) were added and the mixture was vigorously stirred. Subsequently, the organic phase was separated, washed with a saturated solution of sodium chloride, dried with anhydrous magnesium sulphate and concentrated. Finally the raw product was recrystallized from ethyl acetate/hexanes (1/1) resulting in pure (2,3-dihydro-thieno[3,4-b][1,4]dioxin-2-ylmethoxy)-acetic acid as demonstrated by NMR and mass spectroscopy.

Synthesis of 2-{2-[2-(2-methoxy-ethoxy)-ethoxy]-ethoxymethyl}-2,3-dihydro-thieno[3,4-b][1,4]dioxine (M5)

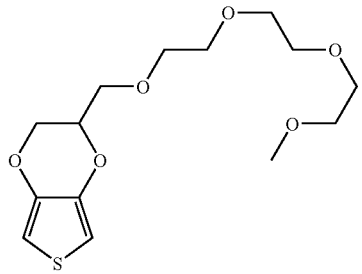

A transetherification reaction between 3,4-dimethoxythiophene (12.9 g, 89 mmol) and {2-[2-(2-methoxy-ethoxy)-ethoxy]-ethoxymethyl}-1,2-ethanediol (24.5 g) in toluene (150 mL) was performed by heating (at 100° C.) a mixture of these compounds under a continuous nitrogen flow for 24 h. Subsequently, the reaction mixture was poured into methylene chloride (200 mL) and the organic phase was washed a 1M aqueous solution of sodium hydrogen carbonate, a concentrated aqueous solution of sodium chloride, dried with anhydrous magnesium sulphate and concentrated. This resulted in a viscous oil. Pure 2-{2-[2-(2-methoxy-ethoxy)-ethoxy]-ethoxymethyl}-2,3-dihydro-thieno[3,4-b][1,4]dioxine was finally obtained by vacuum distillation.

Synthesis of polyethylene oxide substituted (2,3-dihydro-thieno[3,4-b][1,4]dioxin-2-yl)-methanol (M6)

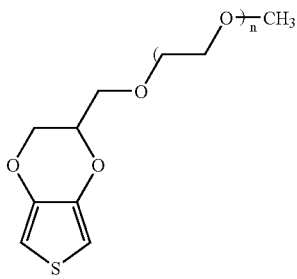

p-Toluenesulphonyl chloride (8.4 g, 44 mmol) was dissolved in pyridine (20 mL), blanketed by nitrogen. A solution of monohydroxy-functionalized polyethylene oxide (Mw=750 g/mol, 15 g, 20 mmol) in pyridine (30 mL) was added dropwise, constantly keeping the reaction temperature around 25–30° C. After addition the reaction mixture was stirred for another 2 h and then poured into ice-water/hydrochloric acid. This aqueous phase was extracted with $CH_2Cl_2$ after which the combined organic fractions were washed with a 1M aqueous solution of sodium hydrogen carbonate. Final purification was done by column chromatography ($Sio_2$, eluant: $CH_2Cl_2$ and ethanol, respectively) resulting in pure tosylate functionalized polyethylene oxide.

(2,3-Dihydro-thieno[3,4-b][1,4]dioxin-2-yl)-methanol (1.0 g, 5.8 mmol) was dissolved in tetrahydrofuran (25 mL) and blanketed by nitrogen. Sodium hydride (0.25 g) was added and stirring was continued for 30 min. Then a solution of the tosylated polyethylene oxide (5.3 g) in tetrahydrofuran (25 mL) was added dropwise. After addition the reaction mixture was brought to reflux for 2 h after which it was cooled to 25° C. again. The reaction mixture was then poured into ice-water (containing a few drops of concentrated hydrochloric acid) and extraction was performed using $CH_2Cl_2$. The combined organic fraction were then washed with a 1M aqueous solution of sodium hydrogen carbonate and a saturated aqueous solution of sodium chloride, dried with anhydrous magnesium sulphate and concentrated. Final purification by column chromatography ($SiO_2$, eluant: $CH_2Cl_2$/methanol (95/5)) resulted in pure PEO-substituted EDOT as was demonstrated with NMR and GPC.

Synthesis of 4-(2,3-dihydro-thieno[3,4-b][1,4]dioxin-2-yl-methoxy)-butane-1-sulfonic acid sodium salt (M7)

(2,3-Dihydro-thieno[3,4-b][1,4]dioxin-2-yl)-methanol (6.9 g, 40 mmol) was dissolved into tetrahydrofuran (100 mL) and blanketed by nitrogen. Sodium hydride (1.76 g) was added and stirring was continued for 30 min. Then butanesultone (6.0 g) was added dropwise after which the reaction mixture was brought to reflux for 3 h. Then it was cooled to 25° C. again, the solvent was removed, methanol was added, the mixture was stirred, filtered and the filtrate was concentrated. The remaining oil was solidified by addition of hexanes and ethanol, followed by stirring. Final filtration and drying resulted in pure 4-(2,3-dihydro-thieno[3,4-b][1,4]dioxin-2-ylmethoxy)-butane-1-sulfonic acid sodium salt as was demonstrated by NMR and mass spectroscopy.

Preparation of 3,4-Alkylenedioxythiophene-copolymers

INVENTION EXAMPLES 23 to 34

Aqueous Copolymerisation of EDOT With M1 to M7 in the Presence of Poly(styrenesulphonic acid) (CP1 to CP12)

The dispersions of the 3,4-alkylenedioxythiophene copolymers of INVENTION EXAMPLES 23 to 34 were prepared by mixing 87 g of a 5.99% aqueous solution of poly(styrenesulphonic acid) [PSS] (Mw=290,000) with 413 g of deionized water at 25° C. in a 1L reaction vessel equipped with a stirrer and a nitrogen inlet. After bubbling nitrogen through this mixture for 30 minutes, EDOT (for quantity see Tables 18A or 18B) and comonomer (for number and quantity see Tables 18A or 18B) were added to this solution. Nitrogen was then again bubbled through the reaction mixture for 30 minutes. 0.0375 g of $Fe_2(SO_4)_3$ and 4.28 g $Na_2S_2O_8$ were then added to initiate the copolymerization reaction. The reaction mixture was stirred at 25° C. for 7 h, after which a further 0.7 g of $Na_2S_2O_8$ was added. After an additional reaction time of 16 h the reaction mixture was treated twice with ion exchanger (50 mL Lewatit™ S100MB+80 mL Lewatit™ M600MB). The resulting mixture was additionally thermally treated at 95° C. for 2 h and the resulting viscous mixture diluted and treated with high shear [microfluidizer at 60 MPa (600Bar)]. This procedure yielded a dispersion of the copolymer (for type, quantity produced and concentration of copolymer in the dispersion see Tables 18A and 18B).

TABLE 18A

| INVENTION EXAMPLE NUMBER | 23 | 24 | 25 | 26 | 27 | 28 |
|---|---|---|---|---|---|---|
| EDOT wt [g] | 1.92 | 1.7 | 1.92 | 1.7 | 1.92 | 1.7 |
| EDOT [mmoles] | 13.5 | 11.96 | 13.5 | 11.96 | 13.5 | 11.96 |
| Comonomer | M1 | M1 | M2 | M2 | M4 | M4 |
| Comonomer wt [g] | 0.258 | 0.516 | 0.258 | 0.516 | 0.345 | 0.69 |
| Comonomer [mmoles] | 1.49 | 3.00 | 1.49 | 3.00 | 1.49 | 3.00 |
| Copolymer dispersion | CP1 | CP2 | CP3 | CP4 | CP5 | CP6 |
| wt of (co)polymer dispersion prepared [g] | 570 | 470 | 560 | 495 | 450 | 455 |
| (co)polymer concentration in dispersion[wt %] | 0.78 | 0.82 | 0.82 | 0.83 | 0.76 | 1.14 |

TABLE 18B

| INVENTION EXAMPLE NUMBER | 29 | 30 | 31 | 32 | 33 | 34 |
|---|---|---|---|---|---|---|
| EDOT wt [g] | 1.92 | 1.7 | 1.92 | 1.7 | 1.92 | 1.7 |
| EDOT [mmoles] | 13.5 | 11.96 | 13.5 | 11.96 | 13.5 | 11.96 |
| Comonomer | M5 | M5 | M6 | M6 | M7 | M7 |
| Comonomer wt [g] | 0.477 | 0.954 | 1.104 | 2.208 | 0.496 | 0.992 |
| Comonomer [mmoles] | 1.49 | 3.00 | 1.49 | 3.00 | 1.49 | 3.00 |
| Copolymer dispersion | CP7 | CP8 | CP9 | CP10 | CP11 | CP12 |
| wt of copolymer dispersion prepared [g] | 690 | 680 | 380 | 510 | 570 | 60 |
| copolymer concentration in dispersion [wt %] | 0.65 | 0.70 | 0.80 | 0.80 | 0.80 | 0.82 |

Characterization of copolymers of Invention Examples 23 to 34

The molecular weights of the copolymers were determined by aqueous gel permeation chromatography relative to sodium poly(styrenesulphonate) with UV-vis absorption detection at 785 nm. The molecular weights of the copolymers prepared in reaction media with less than 3 mg of oxygen/L of reaction medium prior to the addition of initiator together with their concentrations in the dispersions produced and the theoretical concentration in mol % in the comonomer are given in Table 19.

TABLE 19

| Copolymer nr. | Comonomer Nr. | mol % | Concentration of Copolymer/PSS [wt %] | Molecular weight [785 nm] |
|---|---|---|---|---|
| CP1 | M1 | 10 | 0.78 | 620,000 |
| CP2 | M1 | 20 | 0.82 | 580,000 |
| CP3 | M2 | 10 | 0.82 | 670,000 |
| CP4 | M2 | 20 | 0.83 | 725,000 |
| CP5 | M4 | 10 | 0.76 | 560,000 |
| CP6 | M4 | 20 | 1.14 | 540,000 |
| CP7 | M5 | 10 | 0.65 | 650,000 |
| CP8 | M5 | 20 | 0.70 | 725,000 |
| CP9 | M6 | 10 | 0.8 | 430,000 |
| CP10 | M6 | 20 | 0.8 | 415,000 |
| CP11 | M7 | 10 | 0.80 | 750,000 |
| CP12 | M7 | 20 | 0.82 | 780,000 |

Preparation of Layers Prepared With Dispersions Containing the Copolymers of Invention Examples 23 to 34

Coating dispersions were prepared with the dispersions of INVENTION EXAMPLES 23 to 34 as described above for the dispersion of COMPARATIVE EXAMPLES 1 and 2 and INVENTION EXAMPLES 1 and 2 so as to produce layers, upon doctor blade-coating onto a subbed 175 μm poly(ethylene terephthalate) support and drying at 45° C. for 3.5 minutes, with the following composition:

| | |
|---|---|
| Copolymer of ADOT and comonomer (or PEDOT) [copolymer of ADOT and comonomer (or PEDOT) /PSS | 28.9 mg/m² 100 mg/m²] |
| ZONYL ® FSO100 | 8 mg/m² |
| 3-glycidoxypropyl-trimethoxysilane | 100 mg/m² |
| copolymer latex of vinylidene chloride, methacrylate and itaconic acid (88/10/2) | 100 mg/m² |
| N-methyl pyrrolidinone | 2 mL/m² |

Characterization of Layers Containing Copolymers of Invention Examples 23 to 34

In general the expected properties of EDOT-copolymers were intermediate between those of the corresponding homopolymers. Homopolymers of EDOT, M1 and M3 electropolymerized under the same conditions exhibit comparable resistivities to one another, whereas homopolymers of M2, M4 and M6 exhibited significantly higher resistivities than electropolymerized PEDOT, see Table 20.

TABLE 20

| homopolymer of monomer nr. | Resistivity [ohm-cm] | Conductivity [S/cm] |
|---|---|---|
| EDOT | $1.67 \times 10^{-3}$ | 599 |
| M1 | $2.0 \times 10^{-3}$ | 500 |
| M2 | $14.3 \times 10^{-3}$ | 70 |
| M3 | $2.5 \times 10^{-3}$ | 400 |
| M4 | $14.3 \times 10^{-3}$ | 70 |
| M6 | $100 \times 10^{-3}$ | 10 |

The surface resistance and optical density of the layers containing the copolymers of INVENTION EXAMPLES 23 to 34 was determined as described above for the layers containing the homopolymers of COMPARATIVE EXAMPLES 1 and 2 and INVENTION EXAMPLES 1 and 2. The results are given in Table 21.

TABLE 20

| Invention example nr | (Co)polymer nr. | Comonomer nr. | Comonomer mol % | Layer containing (co)polymer Surface resistance [ohm/square] | Ratio of surface resistance after 48h Suntest™ exposure to initial surface resistance | O.D. |
|---|---|---|---|---|---|---|
| 1 | PEDOT 1 | — | 0 | 1200 | 13 | 0.066 |
| 2 | PEDOT 2 | — | 0 | 1200 | 12 | 0.065 |
| 3 | CP1 | M1 | 10 | 1300 | 21 | 0.068 |
| 4 | CP2 | M1 | 20 | 1400 | 27 | 0.068 |
| 5 | CP3 | M2 | 10 | 1300 | 24 | 0.067 |
| 6 | CP4 | M2 | 20 | 1200 | 20 | 0.067 |
| 7 | CP5 | M3 | 10 | 2200 | 74 | 0.060 |
| 8 | CP6 | M3 | 20 | 2500 | 72 | 0.063 |
| 9 | CP7 | M4 | 10 | 1700 | 38 | 0.067 |
| 10 | CP8 | M4 | 20 | 1300 | 24 | 0.067 |
| 11 | CP9 | M5 | 10 | 5800 | 91 | 0.067 |
| 12 | CP10 | M5 | 20 | 23000 | 1766 | 0.062 |
| 13 | CP11 | M6 | 10 | 1900 | 28 | 0.069 |
| 14 | CP12 | M6 | 20 | 1800 | 22 | 0.066 |

The layers containing copolymers CP1, CP2, CP3, CP4 and CP8, copolymers of EDOT with M1, M2 and M5, were surprisingly found to exhibit comparable properties to those of PEDOT 1 and PEDOT 2.

The present invention may include any feature or combination of features disclosed herein either implicitly or explicitly or any generalisation thereof irrespective of whether it relates to the presenetly claimed invention. In view of the foregoing description it will be evident to a person skilled in the art that various modifications may be made within the scope of the invention.

We claim:

1. A process for preparing an aqueous or non-aqueous solution or dispersion of a polythiophene or thiophene copolymer, containing structural units according to formula (I):

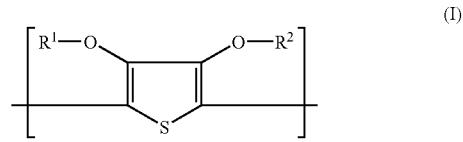

in which $R^1$ and $R^2$ independently of one another represent hydrogen or a $C_{1-5}$-alkyl group or together form an optionally substituted $C_{1-5}$-alkylene residue, comprising the step of: preparing the polythiophene or thiophene copolymer with an initiator in a reaction medium in the presence of polyanions under oxidizing or reducing conditions under an inert atmosphere such that when said initiator is added less than 3 mg of oxygen per litre of said reaction medium is present in said reaction medium.

2. Process according to claim 1, wherein when said initiator is added less than 1.5 mg of oxygen per litre of said reaction medium is present in said reaction medium.

3. Process according to claim 1, wherein when said initiator is added less than 0.5 mg of oxygen per litre of said reaction medium is present in said reaction medium.

4. Process according to claim 1, wherein said structural units according to formula (I) are selected from the group consisting of optionally alkyl group-substituted 3,4-methylenedioxy-thiophene units, optionally alkyl or aryl-group-substituted 3,4-ethylenedioxythiophene units, optionally alkyl or aryl-group-substituted 3,4-ethylenedioxythiophene units, a unit according to formula (I) in which $R^1$ and $R^2$ are together a 1,2-cyclohexene group, optionally alkyl or aryl-group-substituted 3,4-propylenedioxythiophene units, optionally alkyl or aryl-group-substituted 3,4-butylenedioxythiophene units and optionally alkyl or aryl-group-substituted 3,4-pentylenedioxythiophene units.

5. Process according to claim 1, wherein said thiophene copolymer is a copolymer of a 3,4-alkylenedioxythiophene compound with a solubility in water at 25° C. of less than 2.2 g/L with a 3,4-alkylenedioxythiophene compound with a solubility in water at 25° C. of at least 2.2 g/L and a polyanion.

6. Process according to claim 5, wherein said 3,4-alkylenedioxythiophene compound with a solubility in water at 25° C. of at least 2.2 g/L is selected from the group consisting of: 3,4-dihydro-2H-thieno[3,4-b][1,4]dioxin-2-yl)methanol, 3,4-dihydro-2H-thieno[3,4-b][1,4]dioxepin-3-ol, (2,3-dihydro-thieno[3,4-b][1,4]dioxin-2-yl-methoxy)-acetic acid ethyl ester, (2,3-dihydro-thieno[3,4-b][1,4]dioxin-2-yl-methoxy)-acetic acid, 2-{2-[2-(2-methoxy-ethoxy)-ethoxy]-ethoxymethyl}-2,3-dihydro-thieno[3,4-b][1,4]dioxine and 4-(2,3-dihydro-thieno[3,4-b][1,4]dioxin-2-ylmethoxy)-butane-1-sulfonic acid sodium salt.

7. Process according to claim 1, wherein said polyanion is poly(styrenesulphonic acid).

8. Process according to claim 1, wherein said inert atmosphere is a nitrogen, helium or argon atmosphere.

* * * * *